(12) United States Patent
Holub et al.

(10) Patent No.: US 12,079,232 B2
(45) Date of Patent: *Sep. 3, 2024

(54) CONFIGURABLE APPROXIMATE SEARCH OF CHARACTER STRINGS

(71) Applicant: Rapid7, Inc., Boston, MA (US)

(72) Inventors: Viliam Holub, Prague (CZ); Eoin Shanley, Dublin (IE); Trevor Parsons, Boston, MA (US)

(73) Assignee: Rapid7, Inc., Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/940,069

(22) Filed: Sep. 8, 2022

(65) Prior Publication Data
US 2023/0004561 A1    Jan. 5, 2023

Related U.S. Application Data

(63) Continuation of application No. 16/732,165, filed on Dec. 31, 2019, now Pat. No. 11,468,074.

(51) Int. Cl.
| | |
|---|---|
| G06F 16/24 | (2019.01) |
| G06F 16/2455 | (2019.01) |
| G06F 16/2458 | (2019.01) |
| G06N 5/022 | (2023.01) |
| G06N 5/04 | (2023.01) |
| G06N 20/00 | (2019.01) |

(52) U.S. Cl.
CPC .... *G06F 16/2462* (2019.01); *G06F 16/24553* (2019.01); *G06N 5/022* (2013.01); *G06N 5/04* (2013.01); *G06N 20/00* (2019.01)

(58) Field of Classification Search
CPC .................................................. G06F 16/2462
USPC .......................................................... 707/713
See application file for complete search history.

(56) References Cited

U.S. PATENT DOCUMENTS

| | | | |
|---|---|---|---|
| 6,018,735 A * | 1/2000 | Hunter .............. | G06F 16/90344 |
| | | | 707/999.005 |
| 8,521,759 B2 | 8/2013 | Asikainen et al. | |
| 2005/0060643 A1* | 3/2005 | Glass .................... | H04L 51/212 |
| | | | 715/205 |
| 2008/0104072 A1 | 5/2008 | Stampleman et al. | |
| 2017/0058365 A1* | 3/2017 | Locke ................... | C12Q 1/701 |
| 2018/0114131 A1 | 4/2018 | Grimm et al. | |

(Continued)

*Primary Examiner* — Syling Yen
(74) *Attorney, Agent, or Firm* — Ashwin Anand

(57) ABSTRACT

Systems and methods are disclosed for an approximate string searching technique to search for match results that have character differences with the search string. A cost is computed to measure the amount of character differences, and a match is recognized if the cost is below a threshold. The match is determined based on an inferred state machine, whose states are iteratively generated in computer memory for successive characters in the input text. States are added to represent modifications to the string needed to account for character differences and track the costs of the modifications. States are removed when their costs become excessive. Advantageously, the search process never generates the full state machine in memory, retaining only a selected set of best states to continue with the approximate match process. The technique thus enables a practicable implementation of approximate searching that can tolerate an arbitrary number of character deviations.

20 Claims, 16 Drawing Sheets

(56) References Cited

U.S. PATENT DOCUMENTS

2019/0311065 A1* 10/2019 Bross .................. G06F 16/3344
2020/0089723 A1* 3/2020 Kim ....................... G06Q 10/10

* cited by examiner

CONFIGURE APPROXIMATE SEARCH 600

COST FOR DEVIATIONS FROM SEARCH TERM: 610

EXTRA CHARACTER (INS): __2__

MISSING CHARACTER (DEL): __2__

DIFFERENT CHARACTER (SUB): __3__

☒ USE CUSTOM COST FUNCTION: __3 * SUB + 2 * INS + 2 * DEL__

MAXIMUM COST LIMIT: 620

☐ SET DEFAULT COST LIMIT: __12__

☒ AUTOSET COST LIMIT TO: __80% OF SEARCH TERM LENGTH__

ADDITIONAL MATCH RULES: 630

☒ MUST MATCH FIRST __2__ CHARACTERS

☐ IGNORE CHARACTER CASE

☐ TREAT MULTIPLE WHITESPACES AS SINGLE WHITESPACE

SEARCH RECORDS 700

SEARCH TERM: __phishing@website23.com__ 710

☐ USE APPROXIMATE SEARCH WITH COST LIMIT OF __3__ 715

SEARCH RESULTS: 720

| SENDER | RECIPIENT | SUBJECT | DATE |
|---|---|---|---|
| phishing@website23.com | bob@company.com | Problem with your account | 10/31/2019 |

1 RECORD(S) FOUND.

WOULD YOU LIKE TO SEARCH FOR VARIATIONS USING APPROXIMATE SEARCH? 730

YES, SEARCH FOR VARIATIONS WITH UP TO __3__ CHARACTER DIFFERENCES. [SEARCH]

*FIG. 7A*

SEARCH RECORDS 740

SEARCH TERM: C:\Windows\System\svchost.exe    750

SEARCH RESULTS: 760

| EVENT ID | COMPUTER | LOGGED | PROC ID | USER ID | COMMAND LINE |
|---|---|---|---|---|---|
| 4555 | Server C | 11/1/2019 2:00 PM | 0x678 | admin | C:\Windows\System\svchost.exe |

1 RECORD(S) FOUND.

VARIATIONS OF THE SEARCH TERM WERE FOUND USING APPROXIMATE SEARCH. SHOW RESULTS? 770

YES, SHOW RESULTS WITH UP TO _2_ CHARACTER DIFFERENCES.  [ SHOW ]

*FIG. 7B*

SEARCH RECORDS 740

SEARCH TERM: C:\Windows\System\svchost.exe   750

SEARCH RESULTS: 760

| EVENT ID | COMPUTER | LOGGED | PROC ID | USER ID | COMMAND LINE |
|---|---|---|---|---|---|
| 4555 | Server C | 11/1/2019 2:00 PM | 0x678 | admin | C:\Windows\System\svchost.exe |
| 5203 | Server D | 11/1/2019 2:45 PM | 0x339 | admin | C:\Windows\System\svch0st.exe |
| 3943 | Server F | 11/1/2019 3:30 PM | 0x492 | admin | C:\Windows\System\svoh0st.exe |
| 6938 | Server E | 11/1/2019 4:04 PM | 0x598 | admin | C:\Windows\System\svchots.exe |

4 RECORD(S) FOUND.

approximate search results sorted by cost 780

FIG. 7C

CONFIGURABLE APPROXIMATE SEARCH OF CHARACTER STRINGS

This Application claims priority under 35 U.S.C. § 120 and is a continuation of U.S. patent application Ser. No. 16/732,165, filed Dec. 31, 2019, titled "Approximate Search of Character Strings," the entire contents of which are incorporated herein by reference in its entirety.

BACKGROUND

Many companies operate private computer networks that are connected to public networks such as the Internet. While such connections allow company users to easily access resources on the public networks, they also create vulnerabilities in the company network. For example, company users may unwittingly download malicious content (e.g. data, files, applications, programs, etc.) onto the company network from untrusted sources on the Internet. As another example, interactions of company users with the public network may provide opportunities for malicious actors to attack the company network. A malicious actor can plant spyware, viruses, or other types of malicious software in a company's private network though a variety of interactive means, in order to steal sensitive information from the company or even gain control of the company's computing systems. As a result, enterprise security management systems have become increasingly important to protect company networks against these types of vulnerabilities.

Some enterprise security management systems may analyze a company's network using different types of event log data collected from computing resources in the network, to detect conditions such as security vulnerabilities, network attacks, or network breaches. Such analysis typically relies on text searches performed over a large volume of collected log data. However, the use of standard text searching in this context has significant limitations. Small changes to the spelling of a text string make the text string virtually invisible to the analysis software. Attackers can easily evade detection by making small changes to names and identifiers, for example, changing an executable name from "svchost" to "svch0st." As another example, brute force attacks that generate variations of a name or password are notoriously difficult to detect through standard searching. Even when it is known that an attack has occurred, it can be extremely difficult to find traces of the attack in the log data, because the searcher does not know what string variations to search for. More powerful searching techniques are needed to permit searching of variations of text strings that contain unknown misspellings.

SUMMARY OF EMBODIMENTS

The systems and methods described herein may be employed in various combinations and in embodiments to implement an approximate string searching technique to search for match results in input texts that have character differences with the search string. In embodiments, a cost is computed to measure the amount of character differences, and a match is recognized if the cost is below a threshold. In embodiments, the match is determined based on an inferred state machine, whose states are iteratively generated in computer memory for successive characters in the text. During each iteration, states may be added to represent modifications to the search string needed to account for character differences and track the costs of the modifications. States may be removed when their costs become excessive. Advantageously, the approximate matching process never generates the full state machine in memory, retaining only a selected set of best states to continue with the approximate match process. Accordingly, the disclosed technique enables a practicable computer implementation of approximate string searching that can tolerate an arbitrary number of character deviations.

BRIEF DESCRIPTION OF THE DRAWINGS

FIG. 6 illustrates an example user interface used to configure parameters of an approximate search system, according to some embodiments.

FIGS. 7A to 7C illustrate different user interfaces for invoking and viewing results of an approximate search, according to some embodiments.

Figure 1:
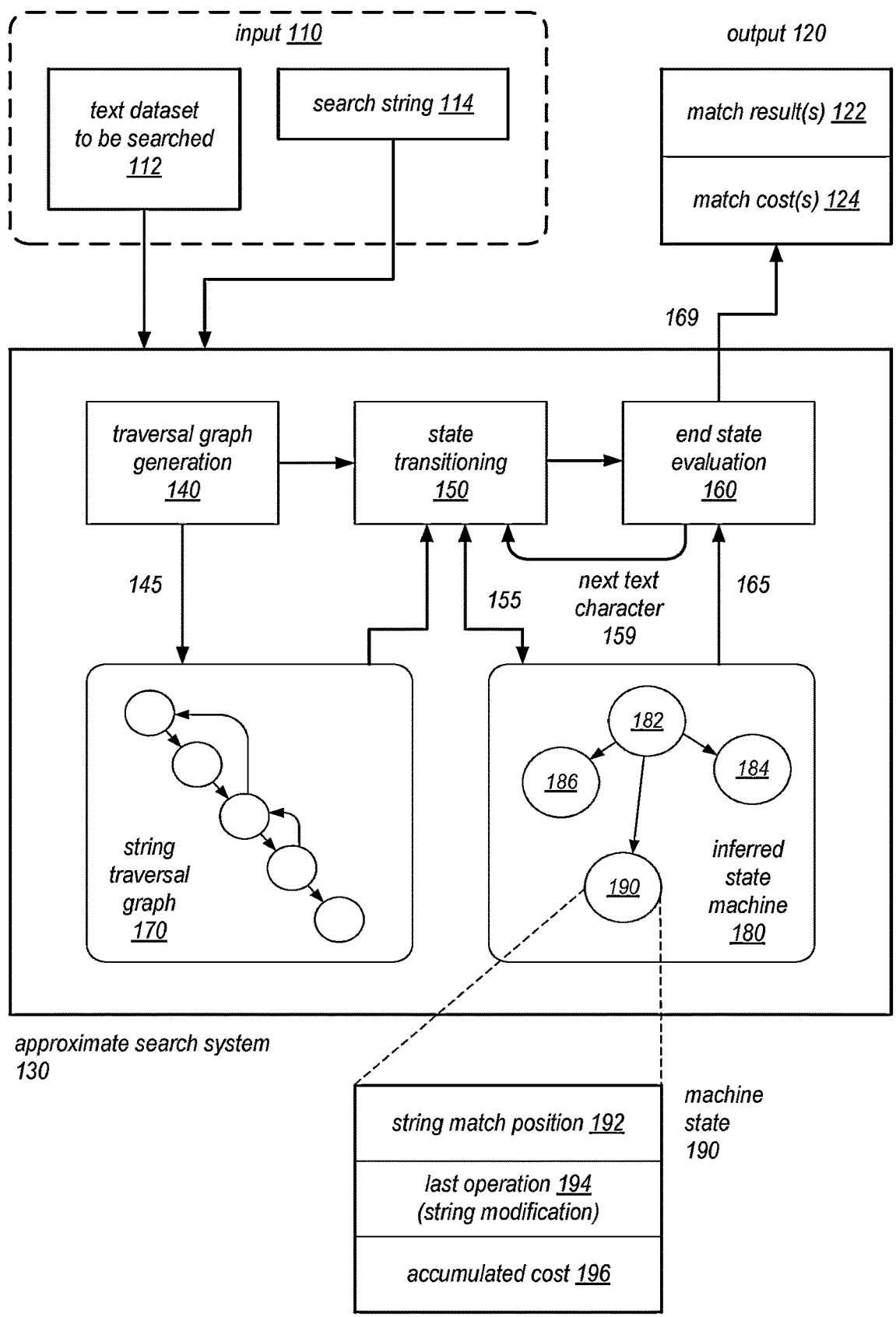
FIG. 1 is a block diagram illustrating an example approximate search system that searches for variations of a search string, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Enterprise security management systems may analyze a company's network based on event log data collected from computing resources in the network, to detect conditions such as security vulnerabilities, network attacks, or network breaches. Such analysis typically relies on text searches performed over a large volume of collected log data. However, standard text searching in this context has significant limitations. In particular, small changes in the spelling of a text string make the text string virtually invisible to the standard searches. A number of attacker tactics have evolved to take advantage of this weakness. For example, attackers may obfuscate certain names by varying the spelling of the names (e.g., from "svchost" to "svch0st"). Phishing attacks may deliberately embed misspellings in the web addresses they use to evade detection. Some types of attacks such as brute force attacks that use variations of common usernames or passwords are notoriously difficult to detect through standard searching. Additionally, in many situations, misspellings may be introduced through routine data processing (e.g., to inject escape characters into strings) or by unintentional human errors (e.g., misspelled parameter names). These types of misspellings of text strings make programmatic detection of the strings nearly impossible. Worse, even when it is known that some variation of a string exists in the data, finding the actual record that contains the string variation can be extremely difficult.

Accordingly, embodiments of an approximate search system and technique are disclosed herein, which can be used to perform efficient searching of variations of text strings in large volumes of data. The approximate search system can produce results that are approximate matches for a given search string, with some amount of character differences such as character substitutions, deletions, or insertions, up to an adjustable error limit.

In some embodiments, the approximate search system may be used to search for approximate matches of a search string in a repository of many data records or texts. For each given text or data record, the approximate search system will attempt to find in the given text a minimal substring of the pattern *(X|SUB|DEL|INS)*, where X represents a character in the search string, SUB represents a substitution of a character in the string, INS represents an insertion of a character to the string, and DEL represents a deletion of a character from the string. For example, an approximate match for the string "mailman" may be found in the variation "madman," which is matched based on the pattern "ma[SUB][DEL]man".

In some embodiments, each match pattern is assigned a price or cost to quantify the pattern's deviation from, or modification of, the original search string. In some embodiments, each type of deviation or modification operation (e.g., SUB, INS, or DEL) may be assigned an operation cost, and the cost of the pattern may be computed by summing the costs of all individual operations in the pattern. In some embodiments, the cost of operation ACCEPT (i.e. an acceptance operation that matches the current character in the text with a character in the search string) may be set so that it is less than the cost of the any other operation SUB, INS, or DEL. In some embodiments, the cost of operation ACCEPT may be set to zero. In some embodiments, the cost of the SUB operation may be set so that it is less than the sum of the costs of INS and DEL. As may be understood, this setting will cause the approximate matching process to prefer a SUB operation over an equivalent pair of INS and DEL operations. In some embodiments, the modification operation costs and the formula for calculating the overall cost of a match may be configurable by the user.

In some embodiments, the approximate match process may construct a traversal graph to represent the search string. The graph may include a path of nodes that correspond to successive characters in the search string. The graph may start with an initial node that corresponds to a zero position before the first character position of the string, and end with a last node that correspond to the last character position of the string. During the approximate match process, the graph is traversed in steps based on the characters in the text, to track the current match position in the search string. Reaching the last position in the graph means that an approximate match has been found.

In some embodiments, the traversal graph is augmented to add failure transitions. A failure transition is a transition that is taken if the match process cannot continue in the graph to the next position for the current character in the text. A failure transition may point backwards, to a node at a lower position than the current node. The failure transition may be generated so that it indicates the longest beginning portion of the search string that matches a processed portion of the text including the current character.

In some embodiments, the augmented graph is generated once for the search string, and used repeatedly to match many texts against the search string. The approximate match process for each individual text is performed based on a state machine inferred from the graph. In some embodiments, the inferred state machine may be implemented as a type of pushdown automaton. Each state in the state machine may indicate a current match position in the search string, a last operation (e.g. one of ACCEPT, SUB, INS, or DEL) performed to arrive at that state, and an accumulated cost expended to reach that state.

The approximate match process may proceed in iterations, where each iteration consumes one character from the text and transitions states in the state machine. However, at any given iteration, the approximate match process only maintains some subset of states of the state machine in computer memory, without holding all possible states in memory. At each iteration, a set of new states may be generated for the state machine from existing states of the state machine (e.g. those states that were retained after the previous iteration). Further, a pruning of the states is performed to remove those states that are duplicative, too costly, inferior to other states, etc., or for other reasons. In some embodiments, the pruning process will also remove end states (i.e. states that have reached the last match position in the traversal graph), since they do not need to be processed in subsequent iterations.

As may be understood, the state machines inferred by the approximate match process can be extremely large. The size of these state machines can grow exponentially with the length of the search string or the length of text being searched. These state machines typically cannot fit within the memory of current computing systems. However, by maintaining only a subset of the states in memory at any given iteration, the disclosed approximate match process limits the amount of memory and processing power that is needed to execute the state machine, thus enabling the state machine to be practically implemented using current computers.

In some embodiments, the approximate match process will constrain the types of new states that can be generated, to further reduce the amount of states that are produced in memory. In some embodiments, a SUB type state (a state that has SUB as its last operation) can be generated only if its preceding state is of type ACCEPT or SUB. In some embodiments, an INS type state is only generated if its preceding state is of type ACCEPT, SUB, or INS. In some embodiments, a DEL type state is only generated if its preceding state is of type, ACCEPT, SUB, or DEL. In some embodiments, a single iteration may generate a sequence of DEL states to remove multiple unmatched characters in the string. In some embodiments, these constraints will cause the match process to produce approximate matches in the form (X SUB*(INS*|DEL*))*. As may be understood, use of these constraints will remove certain match results obtained from combinations of equivalent modification operations.

In some embodiments, if the approximate match process reaches an end state with a cost that does not exceed a cost limit for the search, that end state may be provided as the match result. On the other hand, if the approximate match process ends without reaching an acceptable end state, this means that the text does not contain an approximate match of the search string. In some embodiments, the approximate match process may continue to scan through the entire text even after an acceptable end state has been found. The match process may find multiple acceptable end states for the text, and output the end state with the lowest cost as the match result. In some embodiments, the cost associated with the match result is also included in the output. In some embodiments, if an end state of zero cost is reached, that end state will be outputted immediately, and the match process will be stopped without further examination of additional characters in the text.

The approximate search system may be implemented in many different types of computer systems. In some embodiments, approximate searching may be implemented in a database system that is configured to process queries for approximate searches specified in a type of query language. In some embodiments, the approximate search system may be used to search through log records, such as records of events generated from other computers. In some embodiments, the approximate search system may be used to detect close variations for a library of search terms used for a periodic scan, and report the detected variations to an administrator to be reviewed and added to the library for future scans.

Moreover, the approximate search system may be exposed via many different types of user interfaces. In some embodiments, the search interface may be a graphical user interface (GUI) that provides users the option (e.g. via a checkbox) to perform a string search as an approximate search. The GUI may provide approximate match results in a sorted order, sorted according to their respective match costs. In some embodiments, the user interface may be a command line interface or a query interface. In some embodiments, the approximate search system may be accessed via a programmatic interface such as a web service interface or application programming interface (API).

In some embodiments, a user interface may allow a user to perform an exact search of a search term, and if no results or too few results are found, prompt the user to run the search again using an approximate search. In some embodiments, approximate searching may be enabled by default for every search, and the user interface may provide results of an exact search, along with an indication that additional approximate match results were found using an approximate search.

In some embodiments, the user interface may allow users to specify the cost limit for the search as a parameter of the search request. In some embodiments, the cost limit may be programmatically calculated by the approximate search system, for example, based on the length of the search term, the size of the dataset to be searched, the type or language of the search term, etc. In some embodiments, the cost limit may be dynamically adjusted based on the amount of match results produced by previous searches.

As will be appreciated by those skilled in the art, the disclosed features the approximate search system improve upon current text searching systems in the state of the art to enhance the functioning of these systems. These and other features and benefits of the approximate search system are described in further detail below, in connection with the figures.

FIG. 1 is a block diagram illustrating an example approximate search system that searches for variations of a search string, according to some embodiments.

As shown, the depicted approximate search system 130 in this example is configured to accept input 110 and produce output 120. The input 110 may include a text dataset to be searched 112 and a search string 114 to look for in the text dataset. The text dataset 112 may be a dataset maintained in any manner that can be accessed by the search system 130. For example, the text dataset may be stored as data records in a database or a log file. As another example, the text dataset may be received as a stream of data records, possibly from an external computer system. The text dataset may include a large number of individual texts or records to be searched. In some embodiments, the texts or records may be event records of machine events that were collected from remote machines, which may be sorted by an event timestamp. The records in the text dataset may include searchable fields that can be matched against the search string 114.

The search string 114 is the text string that the approximate search system 130 will look for in the text dataset 112. The search string 114 may be obtained via a variety of means, such as from user input, programmatic input, or from a data store. In some embodiments, the search string 114 may be specified as part of a user query, may include an indication to perform a search of the string 114 using approximate search. In some embodiments, the search string 114 may be received via a graphical user interface (GUI).

The approximate search system 130 may perform the approximate search by attempting to match individual texts or records in the text dataset 112 to the search string 114. Those texts and records that are deemed to be approximate matches to the string will be included in match results 122 of the output 120. In some embodiments, the output 120 may also include the match costs 124 associated with each approximate match result 122. In some embodiments, the output 120 may be provided in a sorted order, based on the match costs of the match results. For example, the output may indicate match results with match costs in an ascending order, to show closer matches before farther matches. The output 120 may be provided in a variety of ways, for example, via a GUI or via a programmatic interface (e.g. as a response to a service request or API call).

As shown in this example, the approximate search system 130 will construct two data structures 170 and 180 to perform the approximate match process for an individual text. In some embodiments, these data structures may be loaded into the main memory of a computer system during execution of the approximate search system 130. In some embodiments, a traversal graph generator component 140 is used to generate 145 a string traversal graph 170. The string traversal graph 170 is constructed as a representation of the search string 114, and it may be reused for each text record in the text dataset 112. In some embodiments, the string traversal graph 170 may be implemented as a graph or an array of indexes, where the nodes represent individual character positions in the search string, and the edges indicate possible transitions among the positions. In some embodiments, the graph 170 may include failure transitions that are backwards pointing, so that a character mismatch at a current position will cause the position to transition back to an earlier position. This graph 170 will be used to determine the current match position of an individual text record during the approximate matching process for the text record, and may be used to infer the state machine 180.

The state machine 180 is inferred from the string traversal graph 170. The state machine will be inferred for each text record and used for the approximate match process for each text record. The state machine will include a set of states (e.g. states 182, 184, 186, and 190). A state may be generated for each successive character in the text, and each state in the inferred state machine 180 corresponds a state of the approximate match process after observation of a next character in the text. At each given character or iteration, the search system will generate a subset of states of the state machine. However, the search system will not generate the full set of states for the inferred state machine 180 in memory, because the full state machine will be prohibitively large for most computing systems. Rather, the approximate match process will perform an iterative process, to repeatedly generate new states and prune existing states for each successive character in the text. In some cases, an existing state in the state machine may generate multiple successive states in one iteration. The match process will continue to generate new states in this fashion, possibly for all characters in the text. If an acceptable end state (e.g. a state that reaches the last match position of the search string with acceptable cost) is generated during the match process, the search system will report that an approximate match has been found.

Individual states of the inferred state machine 180 will include a number of attributes. As shown, machine state 190 in this example includes three attributes 192, 194, and 196. The string match position 192 indicates the current match position in the search string achieved at the state 190. This match position 192 may be determined based on the string traversal graph 170. The last operation 194 indicates an operation that was last performed by the state machine to reach the state 190. In some embodiments, the last operation may be one of ACCEPT, SUB, INS, or DEL, where ACCEPT indicates a match of a last text character in the text to a search string character at the match position, SUB indicates a substitution of the search string character with the text character, INS indicates an insertion of the text character before the search string character, and DEL indicates a deletion of the search string character. In some embodiments, the last operation attribute 194 is used to constrain the type of new states that are generated during the match process. The accumulated cost attribute 196 indicates an accumulated cost that is expended by previous transitions to reach the state 190. For example, if state 190 required multiple modification operations to the search string, the costs of all these modifications are incorporated into the accumulated cost 196. In some embodiments, the cost 196 is used to prune states at each iteration of the match process.

As shown, the iterative match process may be performed using components 150 and 160, which implement a loop body that is executed repeatedly for each next text character 169. During each iteration, the state transitioning component 150 will update 155 a subset of states of the inferred state machine 180 that is maintained in memory. The state transitioning component 150 may generate new states for the inferred state machine 180. The generation may be performed by inferring new states from the existing states of the inferred state machine in memory, the next text character 169, and the string traversal graph 170. The string traversal graph 170 is used to determine the match position 192 of newly generated states.

In some embodiments, the state transitioning component 150 may also implement a pruning of states in the inferred state machine 180. Once a state is pruned, it is no longer maintained as part of the inferred state machine 180 in memory, and subsequent iterations will not generate new states from the pruned state. In effect, the match process will abandon that particular search path for further character matching. The pruning is performed according to a set of rules, which may define pruning criteria for the states. In some embodiments, states that exceed the cost limit for the search will be pruned. In some embodiments, a state that is duplicative to another state (e.g. having the same attribute values) will be pruned. In some embodiments, a state that is inferior to another state (e.g. has a higher cost and/or lower match position) will be pruned. In some embodiments, any generated end state will be pruned, because the end state does not need to be processed during later iterations. It is noted that in some embodiments, the generation and pruning of a particular state may occur within a single iteration of the match process, so that the new state is never added to the inferred state machine 180 in memory. In other embodiments, the state transitioning component 150 will explicitly modify the set of states in memory to add the particular new state, and then explicitly remove the newly added state, all within one iteration of the match process.

As shown, the character loop then proceeds to an end state evaluator 160 to examine 165 any end states that are generated during that iteration. As discussed, an end state is one where the state indicates the final position of the search string as its match position. If there are one or more end states generated, the end state evaluator 160 may check the end states to determine whether their costs are acceptable (e.g. below a cost limit for the approximate search). If so, the evaluator 160 may add that end state to a collection of acceptable end states seen during the match process. The match process will then continue to look for other (potentially cheaper) end states. On or after the last iteration of the match process, the end state evaluator 160 may examine all acceptable end states recorded, and report 169 the end state with the lowest cost as the match result along with the lowest cost. In some embodiments, if an end state with zero cost is detected by the evaluator 160, the evaluator may report 169 the zero-cost end state immediate as the match result, and stop the match process without examining further text characters. As may be understood, a zero-cost end state is the best end state that can be achieved during the match process, and once it is generated, there is no need to look for better end states.

Figure 2:
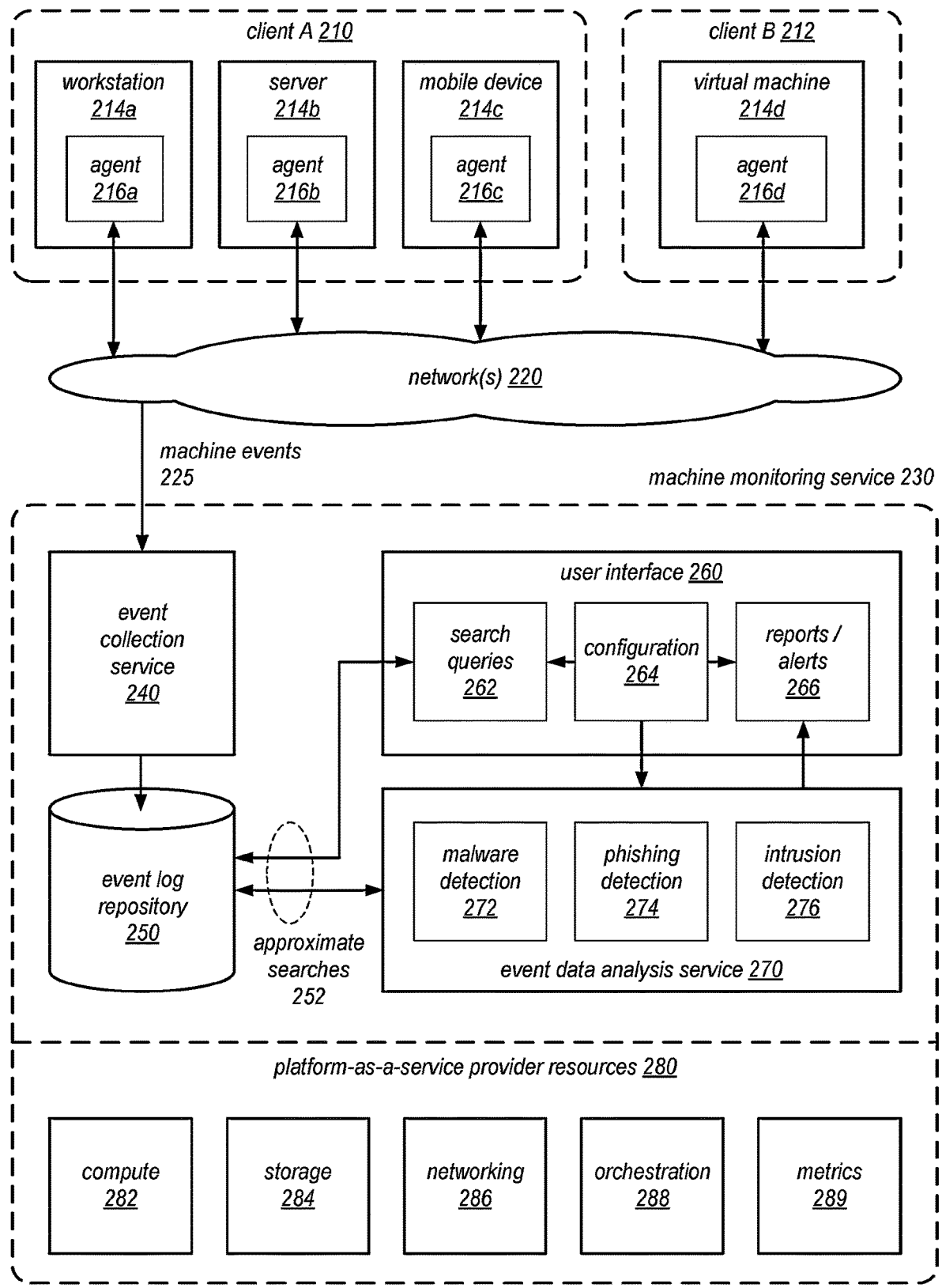
FIG. 2 is a block diagram illustrating a machine monitoring service implemented in a platform-as-a-service provider network that uses approximate searching, according to some embodiments.

FIG. 2 is a block diagram illustrating a machine monitoring service implemented in a platform-as-a-service provider network that uses approximate searching, according to some embodiments.

As shown, in some embodiments, approximate searching 252 as implemented using the approximate search system 130 of FIG. 1 may be employed in a machine monitoring service 230. In some embodiments, the machine monitoring service 230 may be implemented in the cloud and within a platform-as-a-service (PaaS) provider network. As shown, the machine monitoring service 230 may be configured to communicate with many agents 216*a-d* deployed on remote machines 214*a-d* over one or more networks 220. In some embodiments, the agents may be configured to collect or generate machine events 225 about the remote machines, and transmit the machine events to the machine monitoring service 230. In some embodiments, the machine monitoring service 230 may be configured to receive machine events from many different clients (e.g. different entities, companies, organizations, groups, geographic locations, networks, etc.), and perform remote monitoring of the computing resources of these different clients. In some embodiments, distinct clients 210 and 212 may be associated with a different user account of the machine monitoring service 230.

As shown, the clients in this example may own different types of computing resources, such as a workstation 214*a*, a server 214*b*, a mobile device 214*c*, and a virtual machine 214*d*. The virtual machine 214*d* may be an instance of an emulated computer and operating system that is hosted on a physical virtual machine host. The virtual machine host may implement virtualization hardware and/or software (e.g. hypervisors) to execute and manage multiple instances of guest operating systems. Example implementations of such virtualization technologies include VMWARE ESX/ESXI, MICROSOFT HYPERV, AMAZON WEB SERVICES, and MICROSOFT AZURE. As another example, another type of virtualized execution environment may be a container, which provides a portable and isolated execution environment over a host operating system of a physical host. Example implementations of container technologies include DOCKER, GOOGLE KUBERNETES, AMAZON WEB SERVICES, and MICROSOFT AZURE. Depending on the embodiment, the agents 216 may be deployed on other types of computing systems, including embedded systems, networking devices, storage devices, Internet-of-Things (IoT) devices, vehicles, and the like.

In various embodiments, the network 220 may encompass any suitable combination of networking hardware and protocols necessary to establish communications between the agents 216 and the machine monitoring service 230. In some embodiments, the remote machines 214 may execute in a private network of a company, behind a company firewall, and the network 220 may include a public network such as the Internet, which lies outside the firewall. The network 220 may encompass the different telecommunications networks and service providers that collectively implement the Internet. In some embodiments, the network 220 may also include private networks such as private local area networks (LANs), private wide area networks (WANs), or private wireless networks. The network 220 may be implemented using different hardware (e.g., modems, routers, switches, load balancers, proxy servers, etc.) and software (e.g., protocol stacks, accounting software, firewall/security software, etc.) for establishing networking links between the remote machines 214 and the machine monitoring service 230. In some embodiments, the agents 216 may transmit the machine events 225 to the machine monitoring service 230 over the network 220 using secure communication channels such as transport layer security (TLS) connections.

As shown in this example, the machine monitoring service 230 is implemented as a number of services 240, 260, and 270, and a data repository 250 (which may also be a service), hosted within a PaaS service provider network. The agents 216 and other clients of the machine monitoring service 230 may convey services requests to and receive responses from PaaS provider network via network 220. In some embodiments, the service request and responses may be web services requests and responses and formatted as JSON documents. The machine assessment service 230 may support REST-style or document-based (e.g., SOAP-based) types of web services requests. In some embodiments, the machine assessment service 230 may implement service interfaces using other types of remote procedure calling protocols, such as CORBA, GOOGLE PROTOCOL BUFFERS or PROTOBUF. The PaaS provider network may provide the hardware and/or software needed to implement service endpoints, such that a request directed to that endpoint is properly received and processed.

As shown, the PaaS provider network may provide different types of computing resources 280, which can be leased by service customers to implement custom hosted services. As shown, the PaaS provider may provide resource services such as compute resource service 282, storage resource service 284, networking resources service 286, orchestration service 288, and resource metrics service 289. The services of the machine monitoring service 230 may be built using these underlying resource services provided by the PaaS provider. In some embodiments, the PaaS resources 280 may implement features such as load balancing of incoming service requests and/or dynamic management and scaling of service node pools. In some embodiments, each of the services 240, 250, 260, and 270 may be implemented using a pool of service nodes provided by the PaaS provider, which may be individual instances of virtual machines. In some embodiments, the PaaS provider may be a provider such as AMAZON WEB SERVICES or MICROSOFT AZURE.

In some embodiments, the machine monitoring service 230 may be configured to monitor, analyze, and take action on security-related incidents that are detected on the remote machines 214 or entire remote company networks. For example, the machine monitoring service 230 may be configured to monitor user emails to detect phishing attempts. As another example, the service may monitor machine processes or machine event logs to detect the presence of malware. As another example, the service may monitor user activity on remote machines to detect suspicious activity. As another example, the service may monitor inbound connections or password attempts to detect attempted attacks, compromised credentials, or network intrusions.

Additionally, in some embodiments, the machine monitoring service 230 may host machine event data received about the remote machines and allow clients to view, analyze, and receive alerts and/or reports about the event data. For example, the service may allow users to run queries about the collected events for their machines. As another example, the service may provide sophisticated analysis and reporting capabilities to provide users information about their networks. As another example, the service may generate alerts to network owners when a security breach is detected. Depending on the embodiment, the machine monitoring service 230 may be configured to provide a variety of other types of monitoring, analysis, and reporting functions for its clients.

As shown, in some embodiments, monitored machines events 225 may be reported by the agents 216 and received by an event collection service 240. The event collection service 240 may be configured to normalize and preprocess the incoming event data, and store the event data in the event log repository 250. In some embodiments, the event repository 250 may be implemented as one or more hosted database instances provided by the PaaS service provider. In some embodiments, the event data may be stored in a chronological order according to their event timestamps. In some embodiments, the stored data may be encrypted so that different clients are prevented from accessing the events of other clients. In some embodiments, the event data may be stored for a limited amount of time (e.g. one year) before it is removed.

In some embodiments, the event log repository 250 may provide a query interface that allows its data records to be searched using a query language, an API, or a query. In some embodiments, the approximate search system 130 of FIG. 1 may be implemented as component within the repository service 250 to provide approximate searching functionality 252 for queries directed to the repository. In other embodiments, the approximate search system 130 may be implemented as a client-side component external to the repository 250.

As shown, the machine monitoring service 230 may implement a set of user interfaces 260, which may be implemented as GUIs or web interfaces viewable using a web browser. In some embodiments, these user interfaces 260 may be implemented by client-side applications. As shown, the user interfaces may include an interface to issue search queries 262. In some embodiments, some of the functionality of the approximate search system 130 described herein may be implemented by the user interface. For example, the query interface 262 may be configured to receive or generate requests for approximate searches 252, which may be specified in a particular query language. For example, the query language may specify to perform an approximate search by indicating a query operator or a particular function, such as "approx(mailman, 5)". If the query interface 262 is a command line interface, a command parameter may be used to specify an approximate search, for example, "search-approx mailman-maxcost 5". If the query interface 262 is a GUI, one or more user controls (e.g. a checkbox) may be used to specify an approximate search.

In some embodiments, the user interfaces 260 may also implement a configuration interface 264. The configuration interface 264 may be used to configure various aspects of the machine monitoring service 230, including the query interface 262. For example, the configuration interface 264 may be used to specify a default behavior for when approximate searches are to be performed. In some embodiments, the service may be configured to automatically perform an approximate search when results returned for an exact search returns no matches or too few matches. In some embodiments, the service may be configured to dynamically adjust the cost limit for an approximate search based on the amount of results returned for previous runs of the search. As another example, the configuration interface 260 may be used to configure parameters that control the behavior of the approximate search. In some embodiments, the configuration interface can be used to set the costs of operations used during the approximate match process. In some embodiments, the configuration interface may be used to specify the maximum cost limit for approximate searches, or a formula to dynamically determine the cost limit for approximate searches. As shown, the configuration interface 264 may be used to configure other aspects of the machine monitoring service 230, including any approximate searching functionality used in the reporting and alert interface 266 and various components of the event data analysis service 270.

As shown, the event data analysis service 270 may also employ approximate searches 252 in its various components 272, 274, and 276. For example, the malware detection module 272 may perform approximate searches in the event log repository to find machine processes that loaded a known malware executable. The approximate search 252 may be used to find variations of the malware executable name that are not yet known. As another example, a phishing detection module 274 may use approximate searches 252 to find variations of email addresses, web addresses, or email content that are associated with known phishing attacks. As yet another example, an intrusion detection module 276 may use approximate searching 252 to detect variations of a known attacker packet signature. These detected variations may be added to existing protection measures of a network (e.g. SPAM filters, firewalls, network scans, etc.) to guard against the newly detected variations.

Figure 3A:
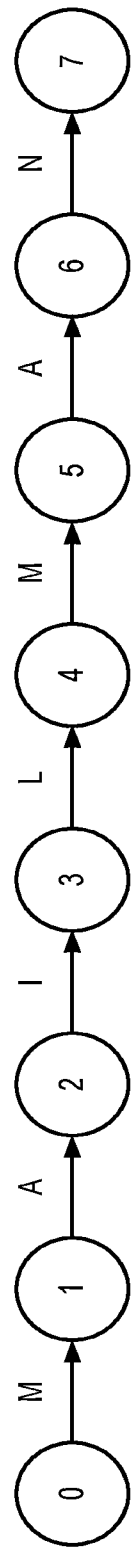
FIGS. 3A and 3B illustrate stages of a string traversal graph generated by an approximate search system for a search string, according to some embodiments.
Figure 3B:
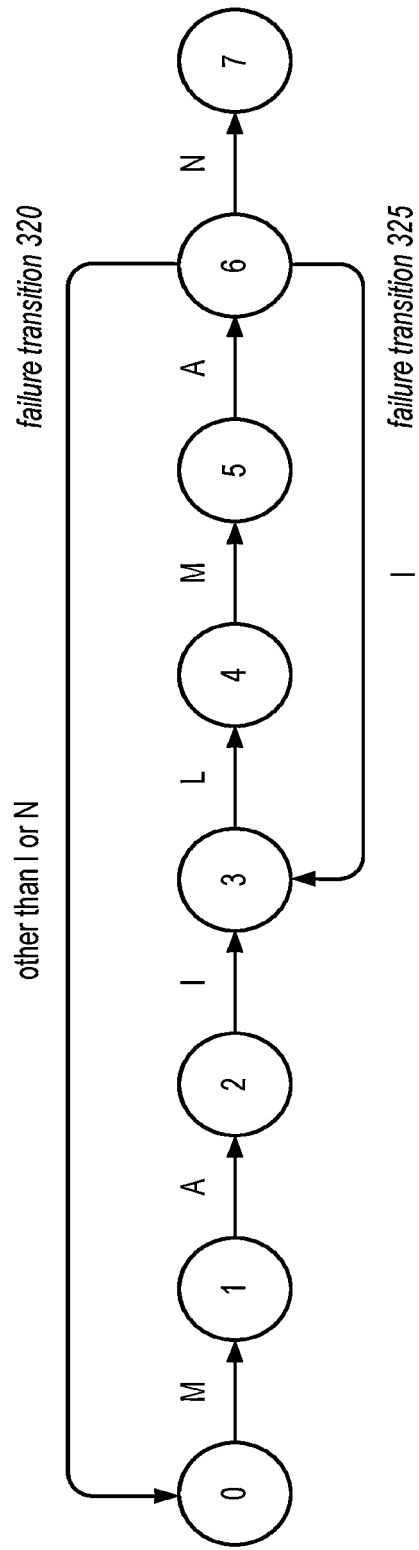

FIGS. 3A and 3B illustrate stages of a string traversal graph generated by an approximate search system for a search string, according to some embodiments. In some embodiments, the shown string traversal graph 310 may be the string traversal graph 170 of FIG. 1.

FIG. 3A shows the string traversal graph 310 at a first stage. As shown, the traversal graph is generated for the search string "mailman." The graph 310 includes eight character match positions 0 to 7, where position 0 is the first initial position and each subsequent position 1-7 corresponds to a next character in the search string. The graph 310 also includes a number of graph transitions among the match positions, which indicate how the match position changes in response to certain input characters.

As discussed previously, the traversal graph 310 is generated to allow the approximate search system to determine possible next positions in the search string during an approximate match process. For example, if a state of the state machine during a match process reaches position 3, this indicates that the match process has already seen characters at positions 1 ("M"), 2 ("A"), and 3 ("I"). As indicated by the traversal graph 310, if the next character in the text is an "L," the new state generated for the next character can advance to position 4. However, the traversal graph at the first stage does not include failure transitions for cases when characters in the text and search string do not match.

FIG. 3B shows the string traversal graph 310 at a second stage. At this stage, two failure transitions 320 and 325 have been added to the traversal graph. A failure transition indicates a next possible search string position when there is a mismatch of the next text character to the current search string position. In most cases, the only possible failure transition will point back to position 0 (as shown by graph transition 320), indicating to start the matching process from beginning of the search string. However, in some cases, a more limited failure transition may be added that points back to some position after position 0. This can occur when some portion of the text including the newly seen character can be matched to a shorter beginning portion of the search string. For example, failure transition 325 can be added at position 6, where the match process has seen "MAILMA." If the next character is an "I," a valid graph transition can occur from position 6 to position 3. This is because a portion of the text, including the next character "I," matches a shorter beginning portion of the search string ("MAI"). In this case, the match process can pick up the match process from position 3 for subsequent characters in the text.

As may be understood, in practice, all possible failure transitions may be generated for every position in the search string. The fully generated traversal graph may be retained in memory and used by the approximate match process to easily determine next match positions for newly generated states.

FIGS. 4A to 4D illustrate different types of states transitions that can occur during an approximate match process of a search string and a text, according to some embodiments. In some embodiments, the states shown in these figures may be the states of the inferred state machine 180, as discussed in connection with FIG. 1.

Figure 4A:
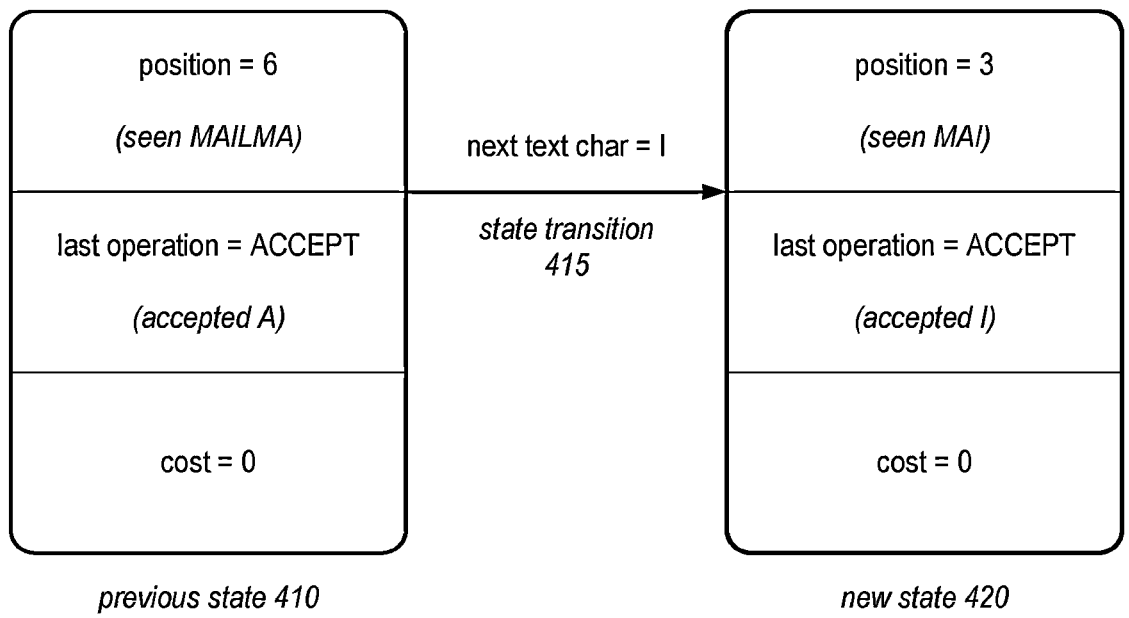
FIGS. 4A to 4D illustrate different types of states transitions that can occur during an approximate match process of a search string and a text, according to some embodiments.

FIG. 4A shows a first type of state transition that can occur when there is character mismatch between a next character in the text and the next match position in the search string. In this case, there is a failure transition indicated in the string traversal graph (e.g. traversal graph 310 of FIG. 3) for the next character. The example in FIG. 4A follows the failure transition example discussed in FIG. 3B. As shown, at previous state 410, the approximate match process has seen "MAILMA," which puts the match position of the previous state at position 6. However, the next text character is I, which prevents a new state to be generated for position 7. However, because there is a failure transition in the traversal graph pointing to position 3, a new state 420 is generated with match position 3, as shown. As a result, approximate match process can generate the new state 420 via state transition 415 according to the failure transition of the traversal graph.

As shown, the states 410 and 420 also include other attributes such as last operation a cost. In this example, the last operation of both states is ACCEPT, which means that the state resulted from a matched character between the text and the search string. In this example, both states indicate a cost of 0, which means that no modifications (e.g. SUB, INS, or DEL) have been performed on the search string to reach these states.

Figure 4B:
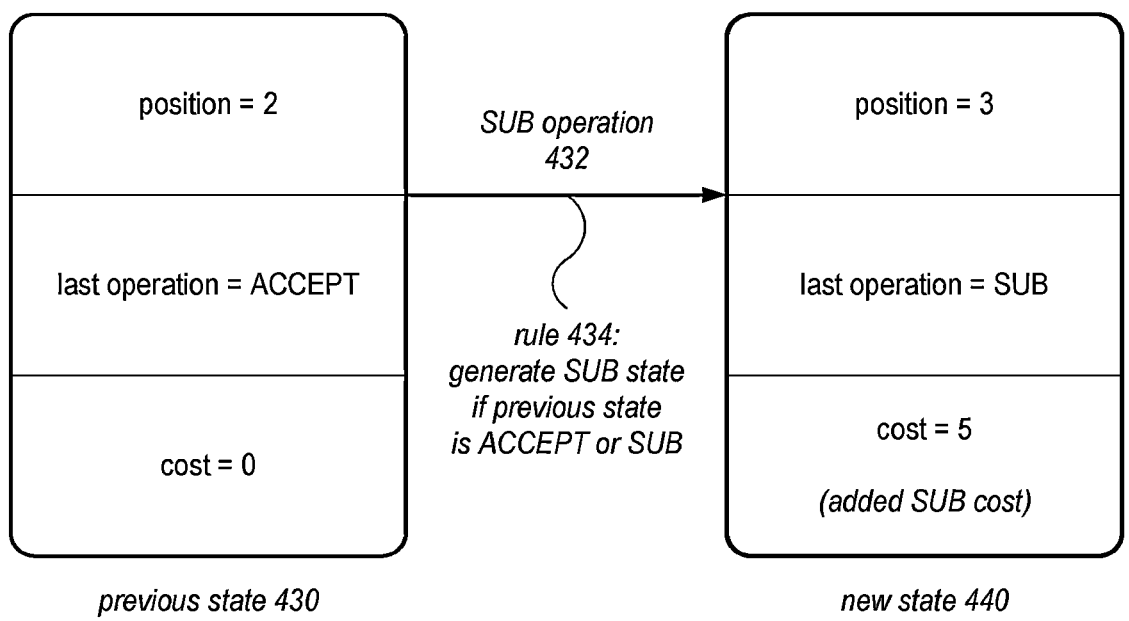

FIG. 4B shows another type of state transition that can occur when there is character mismatch between a next character in the text and the next match position in the search string. This case illustrates a SUB operation 432 performed at a state transition, where the newly generated state 440 results from a substation of a character in the search string. As shown, when this occurs, the match position is advanced in the new state 440 to skip over the mismatched character in the search string. However, the cost of the new state 440 is incremented by a SUB cost, here 5. This accumulated cost will be retained by all subsequent states generated from new state 440.

Additionally, as shown, the last operation of the new state 440 is specified to be SUB. This last operation indicator, which may be referred to as a state "type" of the new state 440, indicates the type of operation (ACCEPT, SUB, INS, or DEL) that was performed on the search string at the last transition to the state. In some embodiments, this last operation attribute is used to constrain what new states can be generated from a parent state. As shown in this example, the approximate search system may implement a rule 434, which only allows SUB type states to be generated when the previous state 430 is of type ACCEPT or SUB. In this case, since the previous state is an ACCEPT state, new SUB state 440 can be generated. As may be understood, the rule is imposed so that SUB states can never be generated from an INS or DEL state. Thus, in this example, any deviation sequence in the text from the search string must begin with a SUB operation, or not include a SUB operation at all. As discussed, this rule 434 may be implemented in some embodiments to limit the matching sequence in the text to a pattern (X SUB*(INS*|DEL*))*. Among other benefits, these rules reduce the search space for finding approximate matches, and reduce the amount of memory and processing power needed to perform approximate searches.

Figure 4C:
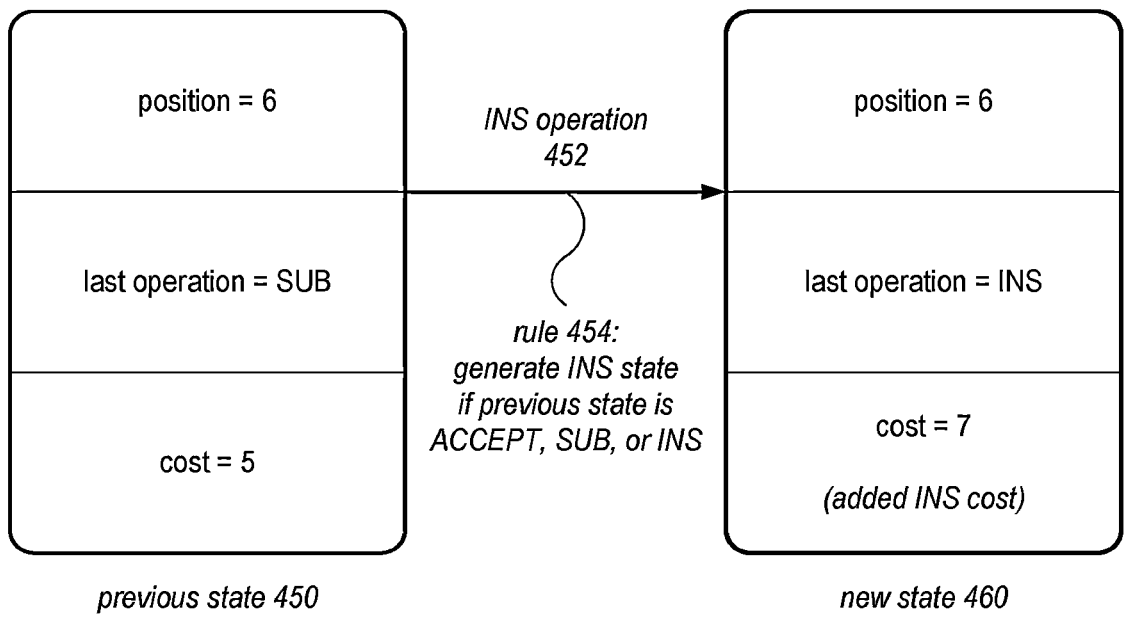

FIG. 4C shows another type of state transition that can occur when there is character mismatch between a next character in the text and the next match position in the search string. This case illustrates an INS operation 452 performed at a state transition, where a new state 460 is generated from a previous state 450 as a result of an insertion of a character in the search string. As shown, as a result of this transition, the match position of the new state 460 remains the same as the previous state 450 because the match process still has not seen the string character at the next match position. However, the text character is consumed. As shown, the new state 460 will also specify its last operation as INS, and add an INS cost (e.g. 2) to its accumulated cost.

As with the SUB operations, in some embodiments, generation of an INS state may be limited by a rule 454 based on the state type of the previous state 450. In some embodiments, an INS state can be generated if the previous state 450 is an ACCEPT, SUB, or INS state. Accordingly, the approximate match process will never attempt to generate a match sequence that performs an INS operation after a DEL operation.

Figure 4D:
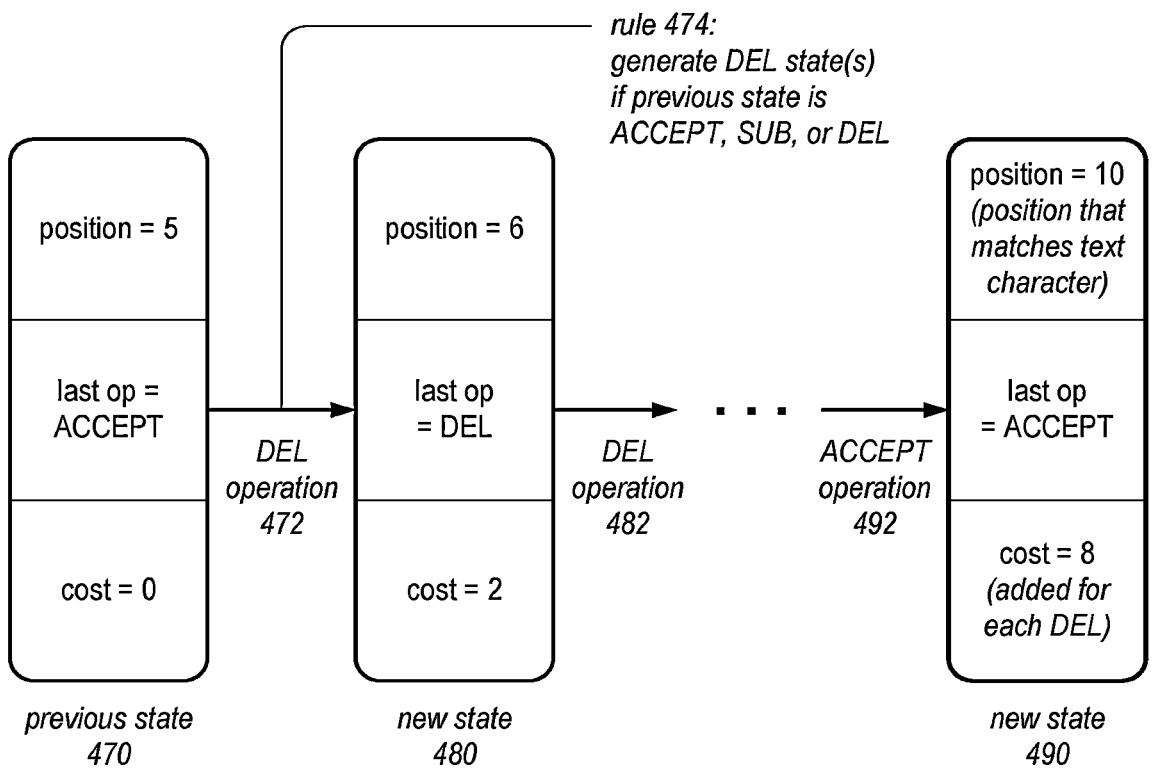

FIG. 4D shows yet another type of state transition that can occur when there is character mismatch between a next character in the text and the next match position in the search string. This case illustrates a number of DEL operations, including operations 472 and 482, performed at a sequence of state transitions. As shown, each DEL operation generates a new state (e.g. state 480) from a previous state (e.g. state 470), and each new state with DEL as last operation (a DEL state) will increment the match position (because a character in the search string is consumed by the DEL operation), and add a cost of DEL operation (e.g. 2) to the accumulated cost. It is noted that in some embodiments, the sequence of DEL operations may be represented as one state that results from a single DEL operation that deletes multiple characters from the search string. The DEL operations will delete all characters in the search string after the match position of the previous state 470 until a match for the next text character is found. In some embodiments, the match process will then generate an additional ACCEPT state (e.g. state 490) via an ACCEPT transition 492, to match the text character with the matching character in the search string. Depending the cost that is spent to perform the DEL operations, the generated DEL states may be retained for a next iteration for further matching, or pruned so that it is abandoned by the match process.

As shown, with the SUB and INS operations, in some embodiments, generation of a DEL state may be limited a rule 474 based on the state type of the previous state 470. In some embodiments, a DEL state can be generated if the previous state 470 is an ACCEPT, SUB, or DEL state. Accordingly, the approximate match process will never attempt to generate a match sequence that performs a DEL operation after an INS operation.

FIGS. 5A to 5D illustrate different types of conditions for pruning states during an approximate match process of a search string and a text, according to some embodiments. In some embodiments, the states shown in these figures may be the states of the inferred state machine 180, as discussed in connection with FIG. 1.

Figure 5A:
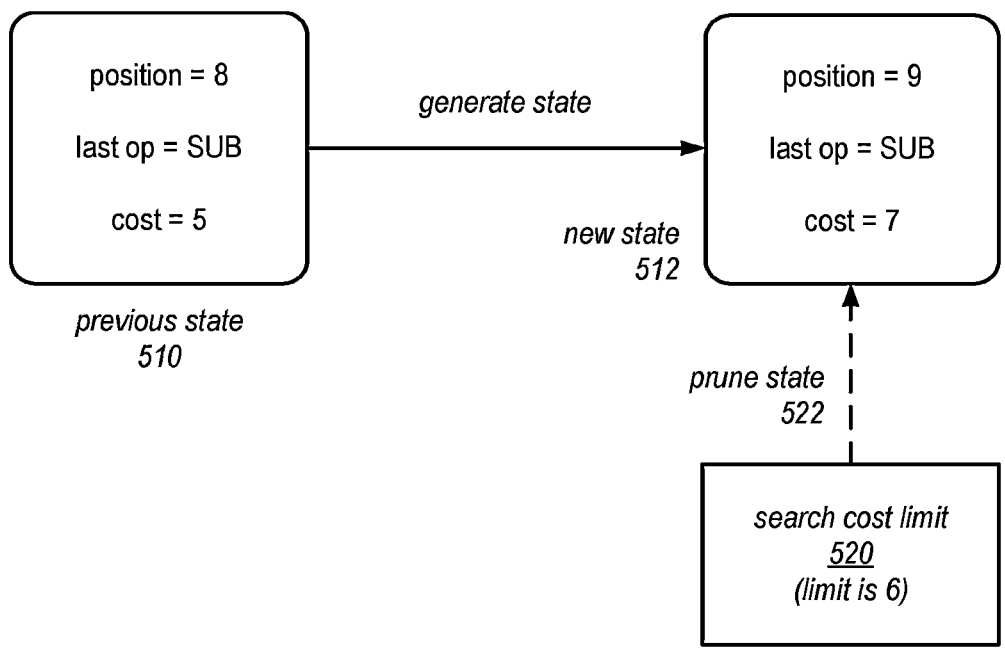
FIGS. 5A to 5D illustrate different types of conditions for pruning states during an approximate match process of a search string and a text, according to some embodiments.

FIG. 5A shows one type of state pruning that can be made during an approximate match process, for example, by the state transitioning component 150 of FIG. 1. In this example, a new state 512 is generated from a previous state 510. The new state 512 advances the match position, but also adds to the accumulated cost of the match due to a modification operation performed on the search string (a SUB operation). In this case, the new cost exceeds a cost limit 520 for the search. In some embodiments, when this occurs, the new state 512 will be pruned 522, so that no further matching will occur on this match path. Depending on the embodiment, the pruning can occur immediately, in the iteration that the new state is generated, or in a subsequent iteration after the generation iteration. In some embodiments, as the match process proceeds, older states from previous iterations are systematically pruned based on other pruning criterion, as will be discussed below.

Depending on the embodiment, the cost limit 520 may be obtained in a variety of ways. In some embodiments, the maximum cost limit may be a user-specified value, either as an input parameter specified in the approximate search request, or as a configuration parameter for the approximate search system in general. In some embodiments, the approximate search system may be configured to automatically or programmatically determine the maximum cost limit. For example, the cost limit may be determined based on the length of the search string (e.g. based on a function of the length), so that shorter search strings can tolerate less character deviations. In some embodiments, the cost limit may be determined based on the length of the text record. In some embodiments, the cost limit may be determined based on the size of the text dataset, so that searches on larger datasets may require more precise matching. In some embodiments, the cost limit may depend on the type of text records or search term used in the approximate search. For example, searches performed on text records in a particular language where the average word length is longer (e.g. German) may tolerate larger amounts of deviations. In some embodiments where a particular approximate search is performed repeatedly (e.g. as part of a periodic data scan), the cost limit may be automatically tuned based on the amount of results that are returned by previous searches. Depending on the embodiment, any combination of these factors may be used in a formula or a rule set to calculate the cost limit for a particular search.

Figure 5B:
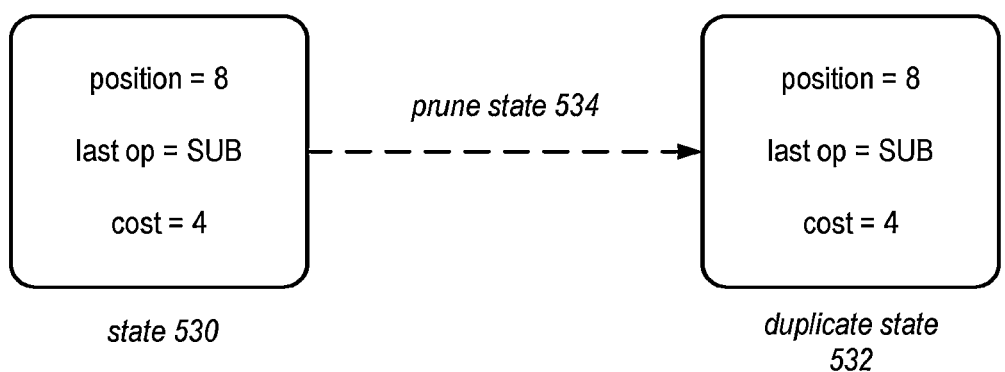

FIG. 5B shows another type of state pruning that can be performed during an approximate match process. In this example, two duplicate state 530 and 532 are generated for the inferred state machine in memory. The two duplicate state have the same state attributes (e.g. the same values for their respective match positions, last operations, and costs). In some embodiments, when this situation occurs, one of the two duplicate state (here state 534) will be pruned 534. As may be understood, there is no reason maintain two duplicate states because they will generate the same match paths in subsequent iterations of the match process. In some embodiments, the two duplicate states may have been generated in different iterations.

Figure 5C:
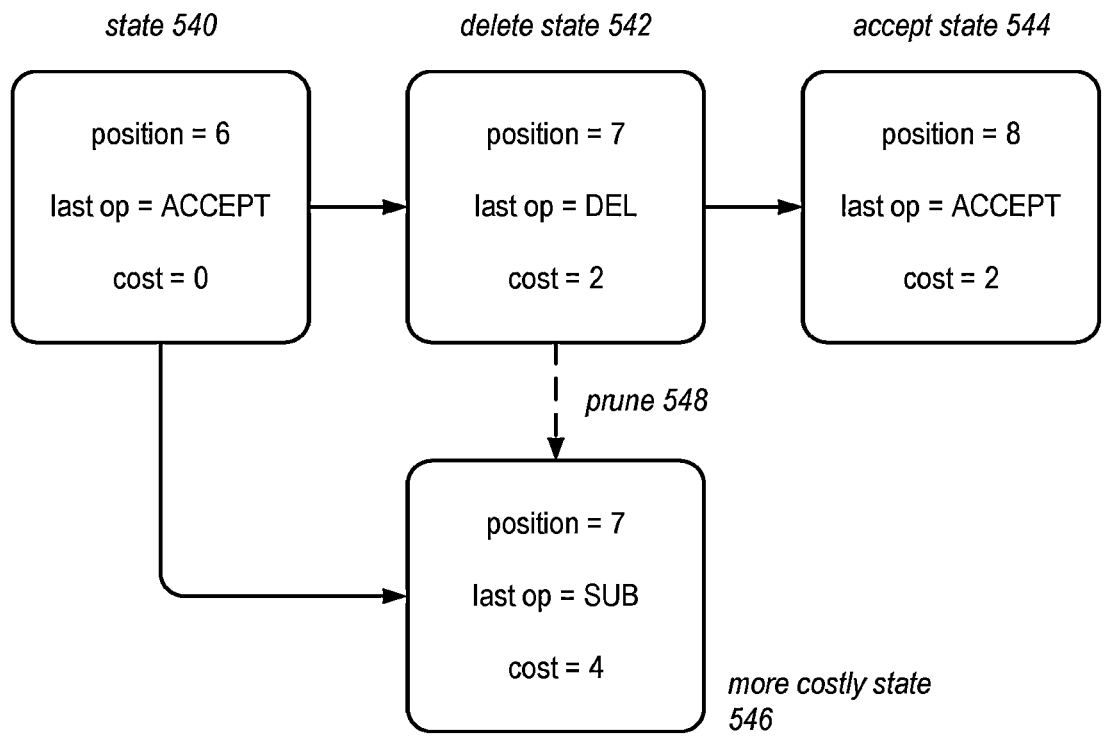

FIG. 5C shows another type of state pruning that can be performed during an approximate match process. In this example, a most costly state 546 is detected with respect to another state 542 of the state machine. As shown, the less costly state is a DEL state 542 that has reached the same match position as the more costly SUB state 546, but with less cost. In some embodiments, the more costly state 546 will be pruned 548. In some embodiments, a state will be deemed to be more costly when its position is equal to or greater than another state, and its cost is greater than the other state.

Figure 5D:
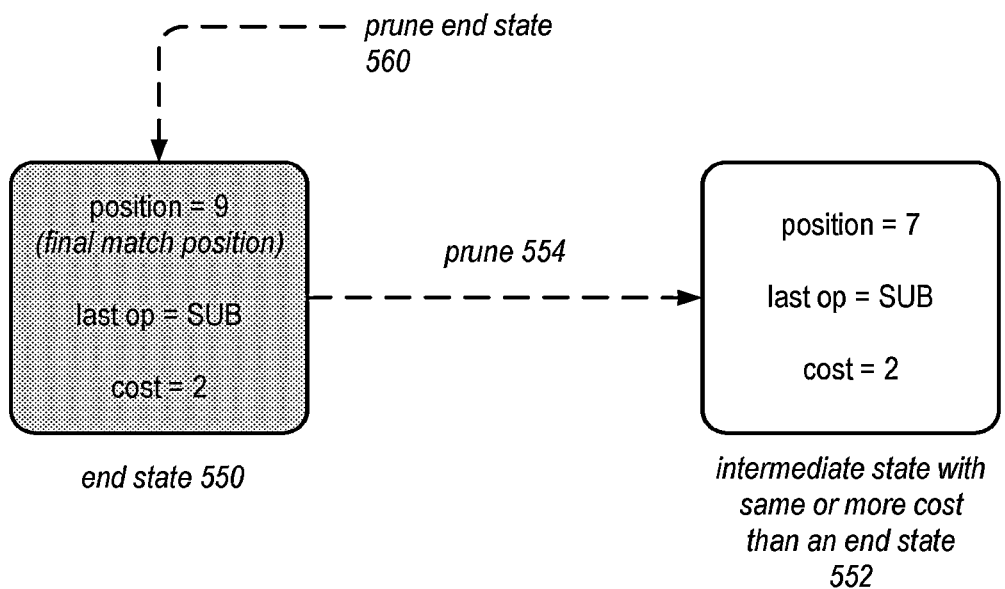

FIG. 5D shows two additional types of state pruning that can be performed during an approximate match process. In this example, state 550 is an end state. As shown, this state has reached a match position that is the final position of the search string. In some embodiments, all end states are pruned 560 by the approximate match process, because they will not be processed any further in subsequent iterations of the match process. However, in some embodiments, the match process may retain some information about all of the end states that are found, so that at the end of the match process, the search system may compare all of the end state to select a best (e.g. lowest cost) end state to report as the match result. In some embodiments, this tracking of end states may be performed by the end state evaluator 160 of FIG. 1.

Additionally, in this example, state 552 is determined to be an inferior state to the end state 550. In particular, state 552 has not yet reached the final position of the search string, but has already accumulated a cost that is equal to the end state 550. In some embodiments, a state will be deemed to be inferior to an end state if it not itself an end state, and has a cost that is equal to or greater than an end state. In some embodiments, these types of inferior states will be pruned 554 by the match process, as shown. It is noted that the pruning criteria discussed in connection with FIGS. 5A to 5D may vary depending on the embodiment. In some embodiments, the pruning criteria used by the approximate search system may be configurable via a configuration interface, such as the configuration interface 264 of FIG. 2.

FIG. 6 illustrates an example user interface used to configure parameters of an approximate search system, according to some embodiments. In some embodiments, the configuration interface 600 shown in the figure may be a part of the configuration interface 264 of FIG. 2.

As shown, the configuration interface 600 is a graphical user interface that allows a user to configure the behavior for an approximate search system. In some embodiments, this GUI may be provided as a web interface, which may be provided as a webpage by a web server and displayed on a web browser.

In this example, the GUI 600 provides a section 610, which allows a user to specify the costs that are used during the approximate match process for text records. The user may specify costs for the different types of character deviations that can be tolerated from the search string during the approximate search. These character deviations may correspond to the character modification operations that are performed by state transitions during the approximate match process. In this example, the GUI 600 also allows the user to specify a formula or function to calculate the total cost of an approximate match. In some embodiments, the user may specify a set of rules (e.g. rules with if-then logic) to determine the cost of an approximate match. In some embodiments, the configuration interface may place certain constraints on the configuration settings, for example, to limit the cost of a SUB deviation to be no more than the sum of the costs of an INS and a DEL deviation.

As shown, the GUI 600 also provides a section 620 that allows the users to configure how the cost limit of the approximate search is determined. In this example, the GUI allows the user to a static default cost limit, which may be overridden by an explicit cost limit specified with particular search requests. In this example, the GUI also allows the user to specify one or more rules to programmatically compute the cost limit of approximate searches. In this case, the cost limit is calculated based on the length of the search term, so that a search term of 10 letters will have a cost limit of no more than 8.

As shown, the GUI 600 may also provide other configuration settings under section 630, which may allow the user to control additional aspects of approximate searches. In this example, the user has specified that an approximate match result must match the search string on the first two characters. Under this configuration, the approximate match system may not allow any character modification states (e.g. SUB, INS, or DEL states) to be generated for the first two characters of the search string, which significantly reduces the search space needed for text records.

FIGS. 7A to 7C illustrate different user interfaces for invoking and viewing results of an approximate search, according to some embodiments. In some embodiments, these interfaces may be implemented as parts of the search query interface 262, as discussed in connection with FIG. 2.

FIG. 7A shows a search records interface 700 which, like the configuration interface 600 of FIG. 6, is a graphical interface and can be provided as a web interface, in some embodiments. As shown, the GUI 700 allows users to perform search terms in records of emails. The user can specify to user approximate searching to perform the search by checking the checkbox 715. The GUI may also provide a user control (e.g. a text field or a number selection control) to specify the cost limit for the approximate search. In this case, the user has indicated an exact search for the search term "phishing@website23.com," without using approximate search. The results of the exact search are indicated in the search results section 720. As shown, the exact search returned only one result.

As shown, when the exact search results are displayed, the GUI 700 may asks 730 the user whether the search should be performed again using approximate searching. The GUI may provide a search button to perform the approximate searching based on a user-specified cost limit. In some embodiments, the option 730 to perform the approximate search may be triggered based on results returned by the exact search. For example, if the exact search returned no results or only a small number of results that is below a threshold, the option for approximate searching may be presented. In some embodiments, the option for approximate searching may be provided when the number of returned results is below a fraction of the number of searched records.

FIG. 7B shows another search records interface 740. In this example, the GUI 740 is used to search through event records of computers for a particular executable name. For example, an event may be generated when a process is launched on a computer. The captured event record may indicate the executable that is loaded into memory for the process. In this case, the search specifies to search 750 for the executable name "svchost.exe." As shown in the results section 760, only one result is found in the event records.

As shown, with the search records, the GUI 740 further provides an option 770 to show additional results that were found using an approximate search of the same search term. In some embodiments, the approximate search is automatically performed along with the exact search, so that approximate match results are generated for viewing along with the exact search results. In this example, if the user clicks on the show button, the GUI 740 will be updated to display the approximate match results, as shown in FIG. 7C.

As shown in FIG. 7C, three additional approximate match results 780 of the search term are provided in the results section 760. The approximate search results may be provided in a sorted order according to their respective match costs, which may indicate how far they deviate from the specified search term. In some embodiments, the search results section 760 may include a user control to allow the user to adjust a cost limit that limits how many approximate search results are displayed.

Figure 8:
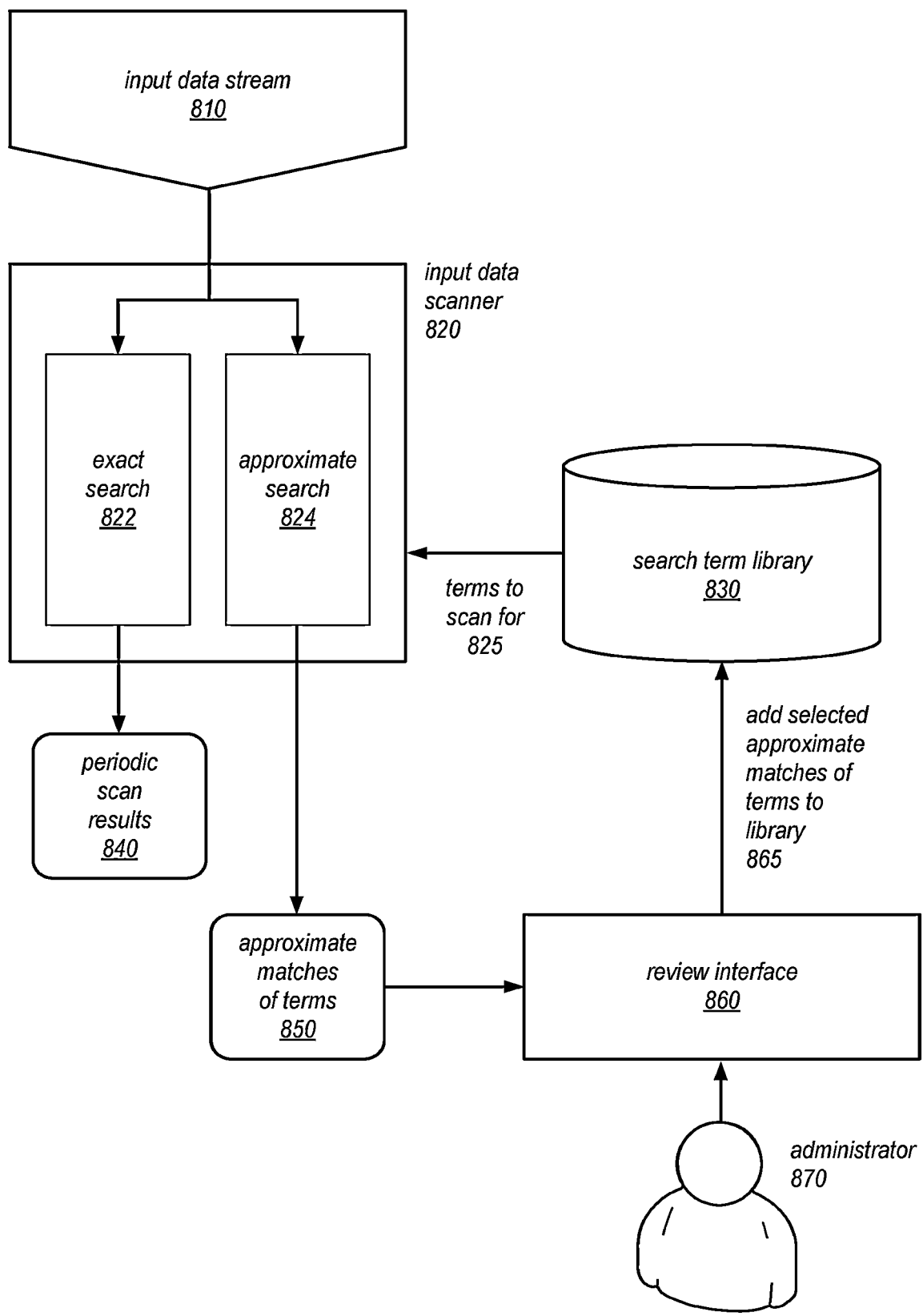
FIG. 8 illustrates an input data scanner that outputs approximate matches of search terms to be added to a library of search terms, according to some embodiments.

FIG. 8 illustrates an input data scanner that outputs approximate matches of search terms to be added to a library of search terms, according to some embodiments.

As shown, the figure depicts an input data scanner 820 configured to consume an input stream 810 of data records. In some embodiments, this input stream may be a stream of event records generated by agents (e.g. the agents 216 of FIG. 2), and the input scanner 820 may implement one or more functions of the event data analysis service 270 of FIG. 2. As shown, the input data scanner 820 may implement an exact search module 822. The exact search module 822 may use exact searching to search for a set of search terms 825, which may be obtained from a search term repository 830. For example, the exact search module 822 may be configured to search for a list of malware executable names, or blacklisted URLs or email addresses, etc. Any detected matches from the exact search is output as periodic scan results 840.

Additionally, the input data scanner 820 in this example also implements an approximate search module 824, which may be an embodiment of the approximate search system 130 of FIG. 1. The approximate search module 824 may be executed along with the exact search module 822 to detect any approximate matches of the search terms 850 in the input data stream 810. For example, the approximate matches may indicate one or more variations of the known malware executable names or blacklisted URLs or email addresses found in the input data stream. These variations may represent an attempt by attackers to vary these names or identifiers to avoid detection. As shown, these approximate matches of the search terms 850 may be provided to a review interface 860 to be reviewed by an administrator 870. The administrator 870 may then add selected approximate matches 865 to the search term library 830, to augment the set of search terms to search for in future scans. In this manner, the input data scanner 820 can be quickly adapted to minor changes in names or identifiers employed by the attackers.

Figure 9A:
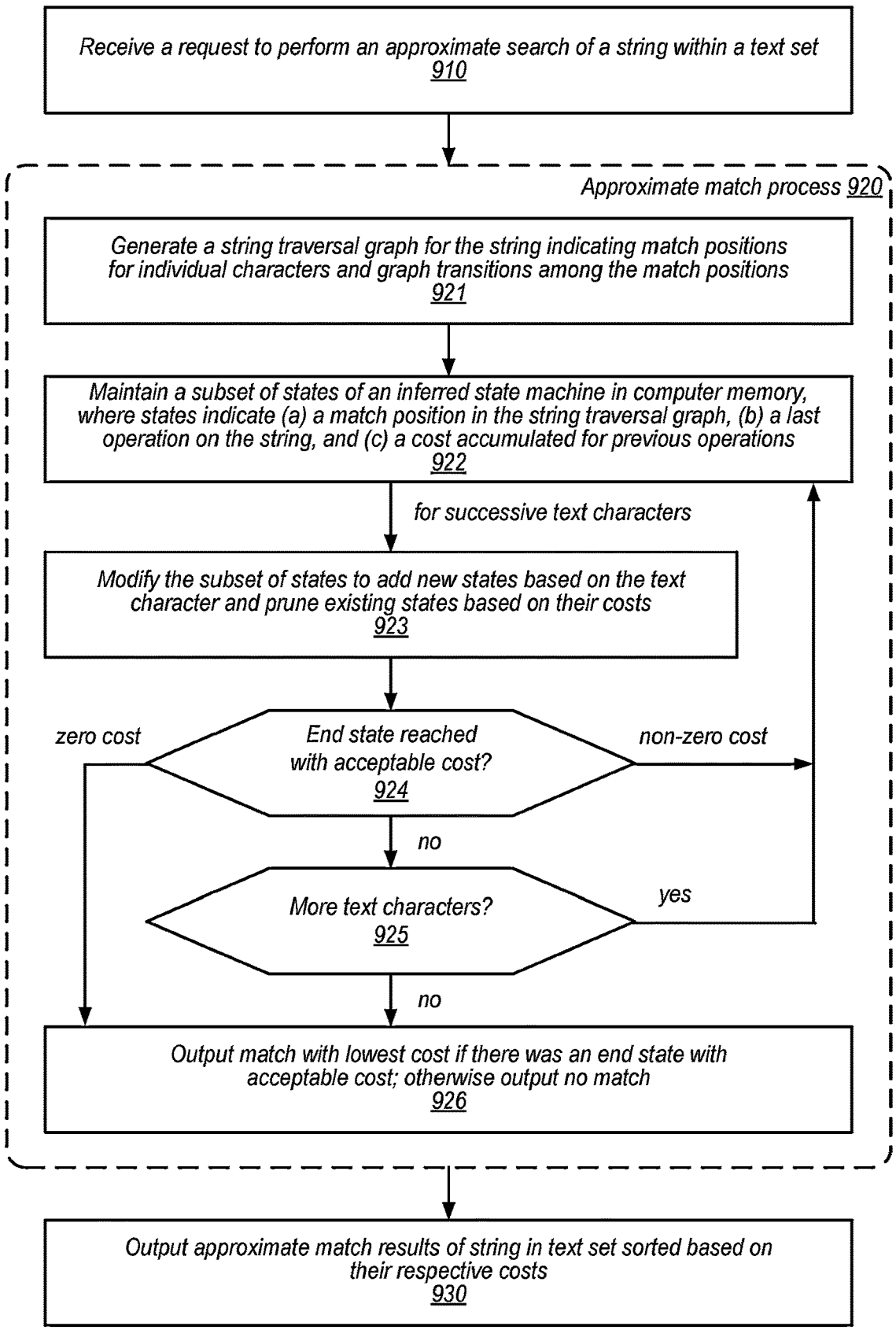
FIGS. 9A to 9C are flowcharts illustrating aspects of an approximate search process performed by an approximate search system, according to some embodiments.
Figure 9B:
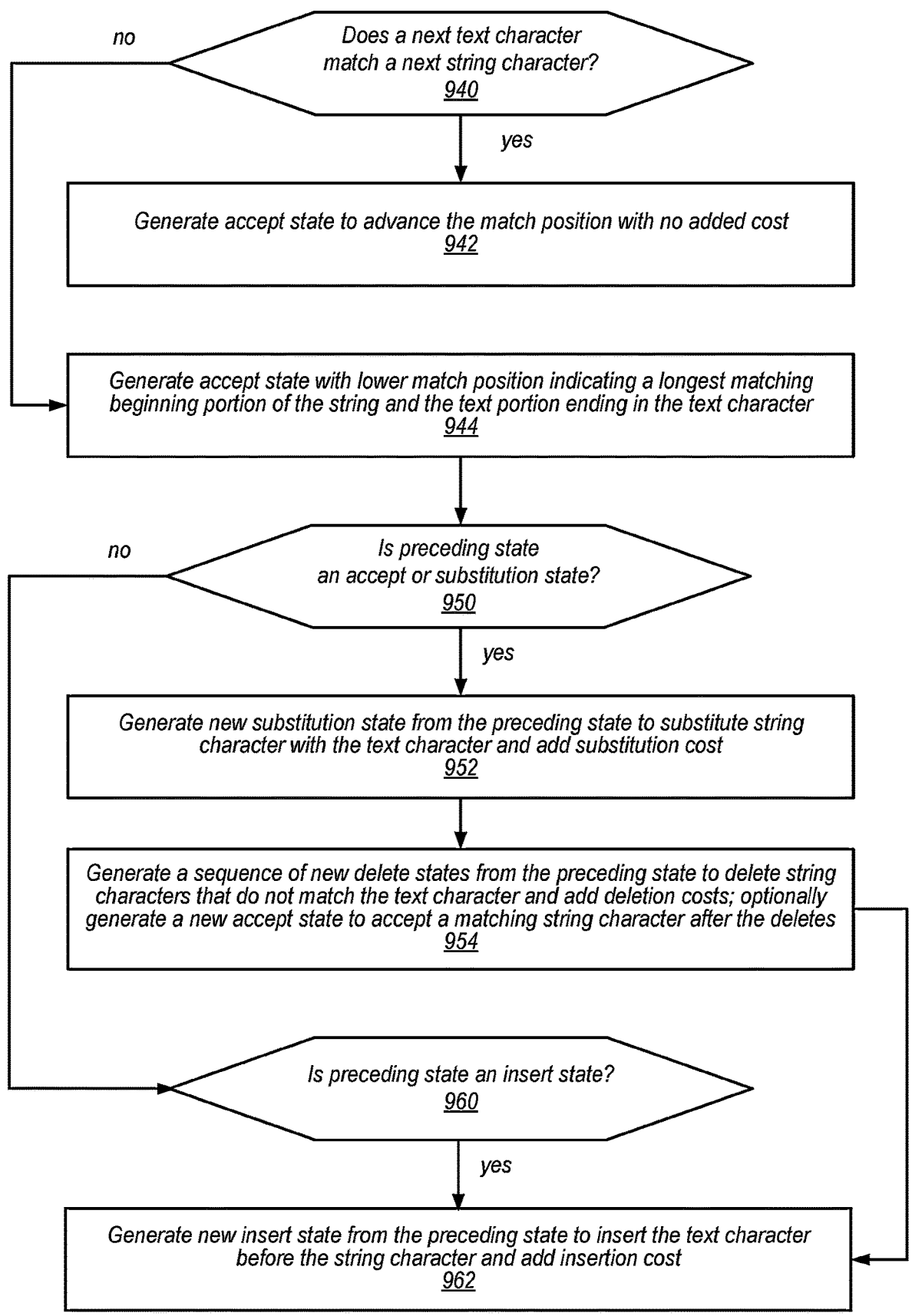
Figure 9C:
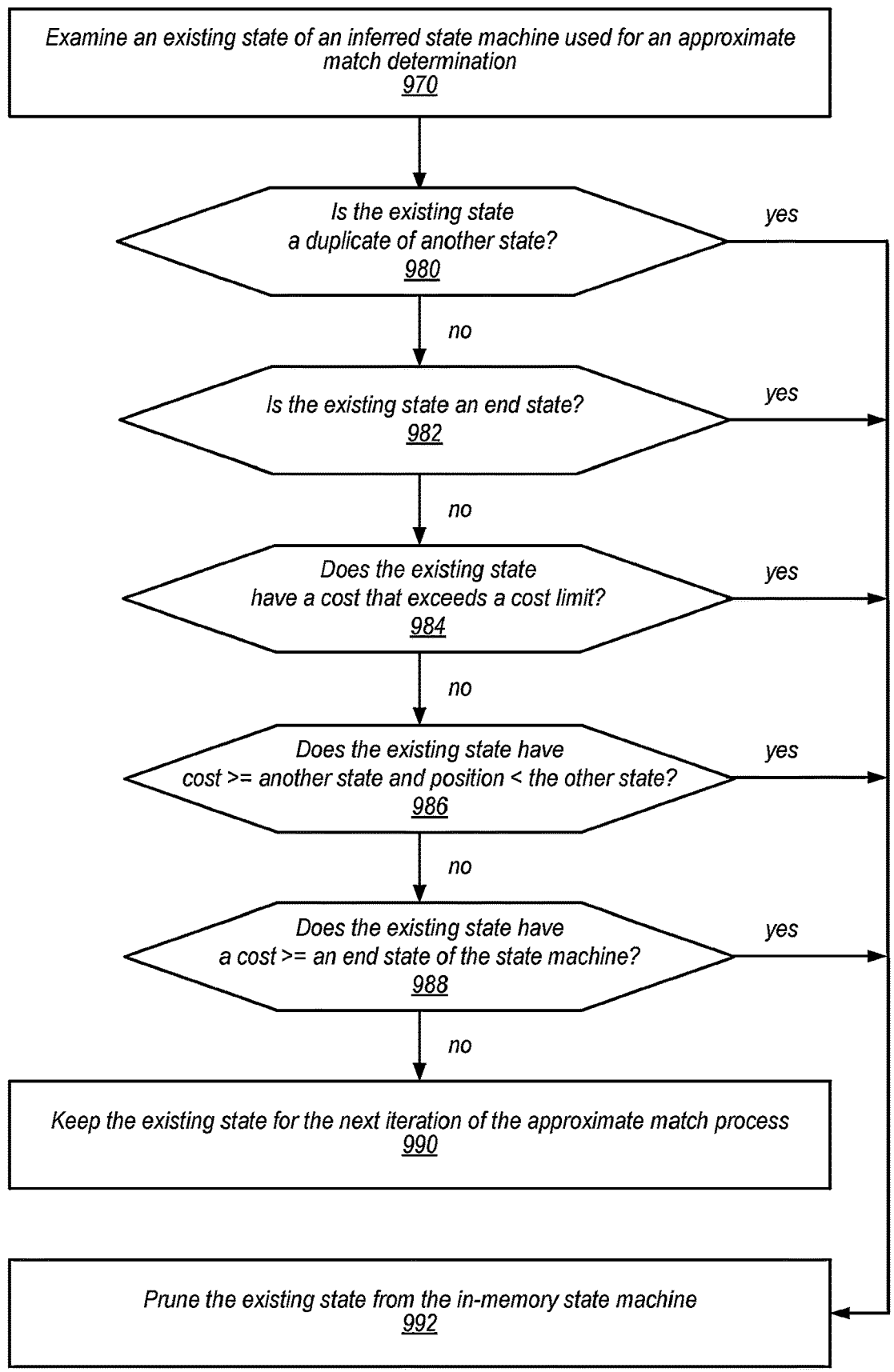

FIGS. 9A to 9C are flowcharts illustrating aspects of an approximate search process performed by an approximate search system, according to some embodiments. In some embodiments, the processes shown in these figures may be performed by the approximate search system 130, as discussed in connection with FIG. 1.

The process of FIG. 9A begins with operation 910, where a request to perform an approximate search of a string with a text set. The request may be received via an interface, such as the search query interface 262 of FIG. 2. In some embodiments, the request may be a query specified in a query language, which may include an indication (e.g. "approx(mailman, 2)") that indicates to perform an approximate search. In some embodiments, the request may be a user request received via an interactive interface such as a GUI or a command line tool. In some embodiments, the request may be a programmatic request received from another software component. The request may include input parameters that the search string (e.g. search string 114) to be used for the approximate search, and the text set (e.g. text dataset 112) to be searched. In some embodiments, the request may also indicate search parameters such as a cost limit to be used for the approximate search. In some embodiments, the cost limit may be programmatically determined based on the length of the search string or the size of the text set.

In some embodiments, the text set may include a large number of text records to be searched. The text records may be logged events generated by remote machines, which may include searchable text fields such as URLs, other types of web addresses, email addresses, executable names, usernames, passwords, among other types of data. Depending on the embodiment, the text records may be stored in a data repository or a text file, or received from another computing system in a stream.

As shown, operations 921 to 926 in the depicted process is performed as part of an approximate match process 920, which may be performed for each individual text record in the text set. At operation 921, a string traversal graph is generated for the string. This string traversal graph may be the string traversal graph 170 of FIG. 1, or graphs 310 and 320 of FIGS. 3A and 3B. The generated string traversal graph may be implemented as a data structure (e.g. an array of indexes), and specify one match position per character in the string. The graph may also indicate graph transitions among the match positions based on input characters. In some embodiments, the graph transitions may include failure transitions (e.g. transition 320 and 325), which transitions backward to a position before the current match position. As discussed, the traversal graph will be used to infer a state machine to carry out the approximate match process for individual text records, and may be reused for multiple text records.

At operation 922, a subset of states of the inferred state machine is maintained in a computer memory (e.g. on the computer that implements the approximate search system). The state machine is inferred from the string traversal graph and may contain states that include attributes such as (a) a match position in the string traversal graph, (b) a last operation (e.g. an ACCEPT, SUB, INS, or DEL operation) performed at a last transition to the state, and (c) a cost accumulated for previous operations performed on the string to arrive at the state. The states may include, for example, attributes of the machine state 190 as discussed in connection with FIG. 1. As shown, other operations of the approximate match process 920 are performed iteratively for successive characters for the individual text records being matched to the search string.

At operation 923, the subset of states in memory are modified for each individual text character. The modification of the in-memory states may be performed by, for example, the state transitioning component 150 of FIG. 1. The modification may include adding or generating new states in the subset, or pruning existing states from the subset, or both. New states are generated based on previous states in the subset and the next character in the text. The match position of the new state may be determined based on a string traversal graph constructed for the search string (e.g. traversal graph 170 of FIG. 1). The newly generated states may include modification operations performed on the search string when the text character does not match the search string character at the current match position. These types of states (e.g. SUB, INS, and DEL type states) are discussed in connection with FIGS. 4B to 4D.

In some embodiments, in-memory states may be pruned based on a number of pruning criteria, as discussed in connection with FIGS. 5A to 5D. Pruning a state may remove the state from the computer memory, so that the pruned state can no longer be used to generate further states of a match path in subsequent iterations. The pruning rules or criteria may be specified so that states that are duplicative, too costly, or otherwise inferior to other seen states are abandoned by the matching process. In some embodiments, end states that reach the final match position of the search string are also pruned. By pruning states of the state machine in this fashion, the approximate match process avoids having to construct the full states machine in memory, which is impractical for most current computer systems. The pruning process generally reduces memory usage and processing power usage, and improves the speed and overall performance of the approximate search.

At operation 924, a determination is made whether a match process has reached an end state with an acceptable cost. An end state may be deemed a state that has a match position at the final position of the search string. An acceptable cost may be a cost that does not exceed cost limit of the search. In some embodiments, the determination of operation 924 may be performed by the end state evaluator 160 of FIG. 1. As shown, in some embodiments, if the cost of an end state is zero (e.g. because no modifications were performed on the search string for the match), the match process may terminate and proceed directly to operation 926 to output the zero-cost end state a match. However, if the end state is not a zero-cost end state, the end state evaluator may track it as one possible end state for approximate match process, and continue with the match process to find other potentially better end states.

At operation 925, a determination is made whether there are any further characters remaining in the text record being examined. If so, the match process continues to the next character. If not, the match process is at an end, and proceeds to operation 926.

At operation 926, an output is generated for the approximate match process. If there were not acceptable end states found during the match process, no match will be reported. However, if there was at least one end state found during the match process, an end state with the lowest match cost will be reported as the approximate match. In some embodiments, the output may also include the lowest match cost.

At operation 930, after the approximate match process is performed on all text records in the text set, the approximate match results of the search string are outputted. The output may be provided via an interface such as the search query interface 262 of FIG. 2, or the GUIs 700 and 740 shown in FIGS. 7A to 7C. In some embodiments, the results may be provided in a sorted order, ordered according to the respective costs of the approximate matches. In some embodiments, these costs may represent a quantitative measure of how close each approximate match is, and sorting the results in this fashion allows users to easily see the relative closeness of individual approximate match results.

FIG. 9B illustrates a process of generating new states during an approximate match process, as discussed in connection with FIG. 9A. In some embodiments, the illustrated operations in this figure may be performed as part of operation 923 of FIG. 9A.

At operation 940, a determination is made whether a next text character in an individual text record matches a next string character in the search string. The next text character is an individual character in the text record being examined in an iteration of the approximate match process, and the next string character is the character in the search string at the current match position for the iteration.

If the text character matches the search string character, the approximate match process proceeds to operation 942, where an ACCEPT state is to advance the match position with no added cost. In some embodiments, this may be the only new state generated in the iteration if there is a match of the text character and the string character. However, if the text character and the search character do not match, a number of other new states may be generated.

At operation 944, an ACCEPT state is generated with a lower match position than the match position of the previous state in the state machine. The generation of this type of ACCEPT state is discussed in connection with FIG. 4A. As discussed, in some embodiments, the approximate match process may revert back to an earlier position in the search string to continue to match process. The lower match position of the new ACCEPT state will indicate the longest beginning portion of the search string that matches a portion of the text record ending in the next text character. No additional costs will be added for this type of ACCEPT state. The process then proceeds to operation 950 to generate one or more modification states that modify the search string.

At operation 950, a determination is made whether the preceding state is and ACCEPT or SUB state. If so, in this example, the process proceeds to operations 952 and 954 to generate a new SUB state and a sequence of one or more DEL states, as discussed in connection with FIGS. 4B and 4D. The SUB and DEL states will represent two different match paths for match process going forward. As discussed, in some embodiments, the generation of new string modification states may be constrained by the type of their parent state. In some embodiments, the approximate match process may be constrained to generated, in a single sequence of modifications, all SUB states (if any) before all INS and DEL states (if any). Moreover, the approximate match process may implement rules to generate either INS or DEL states in a single modification sequence, but not both. Accordingly, a SUB state at operation 952 is only generated if the preceding state is an ACCEPT state or SUB state (and not an INS or DEL state), and the sequence of DEL states at operation 954 is only generated if the preceding state is an ACCEPT state or SUB state (and not an INS state).

At operation 952, the new SUB state is generated from the preceding state. In some embodiments, the SUB state will the next character in the search string with the text character, and add a substitution cost. This operation may be performed in similar fashion as discussed in connection with FIG. 4B.

At operation 954, the sequence of DEL states is generated from the preceding state. In some embodiments, the DEL states will delete one or more characters from the search string staring at the current match position until a string character that matches the text character. The DEL state(s) will each increment the match position from its preceding state, and add a deletion cost to the state. If there is a matching string character at the end of the sequence of DEL states, a last ACCEPT state may be generated to consume that string character. If there is no matching string character at the end of the DEL states (e.g. if the DEL sequences deletes all remaining characters of the search string), there will be no ACCEPT state. In that case, the last DEL state in the sequence will be an end state.

At operation 960, a determination is made whether the preceding states is an INS state. If so, (that is, if the preceding state is an ACCEPT, SUB, or INS state), the process proceeds to operation 962 to generate a new insert state from the preceding state, which represents yet another different match path from the preceding state.

At operation 962, the new INS state is generated from the preceding state. The INS state will insert the text character to the search string before the current match position, not advance the match position, and add an insertion cost to the cost of the new INS state. In some embodiments, the generation of the INS state will be performed in similar fashion as discussed in connection with FIG. 4C. As discussed, some of these newly generated states may be immediately pruned based on various pruning rules, and the approximate match process will continue with the remaining states into the next iteration to generate additional states.

FIG. 9C illustrates a process of pruning machine states during an approximate match process, as discussed in connection with FIG. 9A. In some embodiments, the illustrated operations in this figure may be performed as part of operation 923 of FIG. 9A.

At operation 970, an examination is made of an existing state in the in-memory states of the inferred state machine during the approximate match process of a text record and a search string. The existing state may be a state that has been just generated in the current iteration or an older state that was generated in an earlier iteration.

At operation 980, a determination is made whether the existing state is a duplicate of another state generated for the state machine. If so, one of the duplicate states (e.g. the existing state) is pruned at operation 992. In some cases, the other duplicate state may be a state that has already been pruned previously. However, because a duplicate state has already been seen by the match process, there is no reason to re-explore the match path twice. The pruning criterion of this operation is discussed previously in connection with FIG. 5B.

At operation 982, a determination is made whether the existing state is an end state. In some embodiments, an end state may be a state having a match position that is at the final position of the search string. If the existing state is an end state, it will be pruned, because there is no further exploration that needs to be done for the end state in subsequent iterations. This pruning criterion is discussed previously in connection with FIG. 5D.

At operation 984, a determination is made whether the existing state has a cost that exceeds a cost limit. The cost limit may be a limit that was explicitly indicated in the search request or by a configuration setting, or computed based on factors such as the length of the search string or the size of the text dataset. If the existing state has a cost that is greater than the cost limit, in some embodiments, the state will be immediately pruned because it cannot lead to an end state with acceptable cost. This pruning criterion is discussed previously in connection with FIG. 5A.

At operation 986, a determination is made whether the existing state has a cost that is greater than or equal to another state, but a match position that is less than the other state. In some embodiments, the other state may be a state that was previously seen by the match process, but one that has already been pruned. In some embodiments, the other state must be a "live" state that is currently maintained in memory. If this condition is satisfied, the existing state may be deemed to be an inferior state to the other state, and pruned from state machine. This pruning criterion is discussed previously in connection with FIG. 5C.

At operation 988, a determination is made whether the existing state has a cost that is greater than or equal an end state seen by the match process, where the existing state is not itself be an end state. In some embodiments, this condition indicates that the existing state cannot achieve a better match (e.g. lower cost match) than the end state, and the existing will be pruned for this reason. This pruning criterion is discussed previously in connection with FIG. 5D.

If any of the pruning criteria discussed previously applies to the existing state, the existing state will be pruned at operation 992, where it is removed from the in-memory state machine so that no subsequent states will be generated from the pruned state. In effect, the match process will abandon the match path ending in the pruned state. At the next iteration of match process, new states from be generated from the surviving states of the previous iteration.

Figure 10:
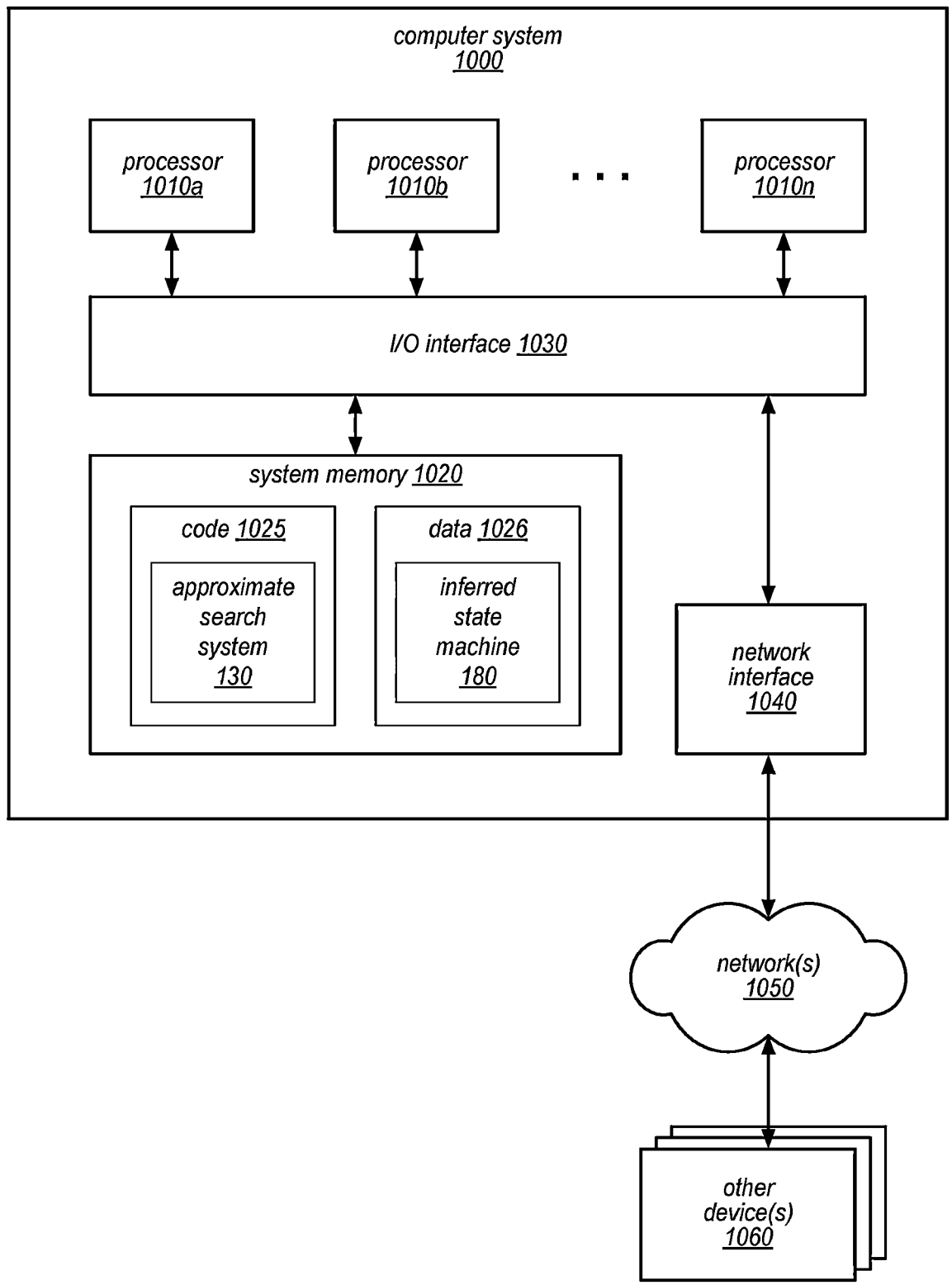
FIG. 10 is a block diagram illustrating an example computer system that can be used to implement one or more portions of an approximate search system, according to some embodiments.

FIG. 10 is a block diagram illustrating an example computer system that can be used to implement one or more portions of an approximate search system, according to some embodiments. For example, the computer system 1000 may be a server that implements one or more components of the approximate search system 130 of FIG. 1.

Computer system 1000 may be implemented using a variety of computing devices, such as a personal computer system, desktop computer, laptop or notebook computer, mainframe computer system, handheld computer, workstation, network computer, a consumer device, application server, mobile telephone, or some other type of computing device.

As shown, computer system 1000 includes one or more processors 1010, which may include multiple cores coupled to a system memory 1020 via an input/output (I/O) interface 1030. Computer system 1000 further includes a network interface 1040 coupled to I/O interface 1030. In some embodiments, computer system 1000 may be a uniprocessor system including one processor 1010, or a multiprocessor system including several processors 1010a-n, as shown. The processors 1010 may be any suitable processors capable of executing instructions. For example, in various embodiments, processors 1010 may implement one of a number of instruction set architectures (ISAs), such as the x86, PowerPC, SPARC, or MIPS ISA.

As shown, the computer system 1000 may also include one or more network communication devices (e.g., network interface 1040) for communicating with other systems and/or components over a communications network. For example, an instance of an application executing on computer system 1000 may use network interface 1040 to communicate with another server application executing on another computer system, as described herein.

As shown, computer system 1000 may use its network interface 1040 to communicate with one or more other devices 1060, such as persistent storage devices and/or one or more I/O devices. In some embodiments, these some of these other devices may be implemented locally on the computer system 1000, accessible via the I/O interface 1030. In various embodiments, persistent storage devices may include to disk drives, tape drives, solid state memory, other mass storage devices, or any other persistent storage device. The computer system 1000 may store instructions and/or data in persistent storage devices, and retrieve the stored instruction and/or data as needed.

As shown, the computer system 1000 may include one or more system memories 1020 that store instructions and data accessible by processor(s) 1010. In various embodiments, system memories 1020 may be implemented using any suitable memory technology, (e.g., one or more of cache, static random-access memory (SRAM), DRAM, RDRAM, EDO RAM, DDR 10 RAM, synchronous dynamic RAM (SDRAM), EEPROM, non-volatile/Flash-type memory, etc.). The system memory 1020 may be used to store code 1025 or executable instructions to implement the methods and techniques described herein. For example, the executable instructions may include instructions to implement executable modules of the approximate search system 130, as discussed. The system memory 1020 may also be used to store data 1026 needed by the executable instructions. For example, the in-memory data 1026 may include portions of the inferred state machine 180, as discussed.

In some embodiments, some of the code 1025 or executable instructions may be persistently stored on the computer system 1000 and may have been loaded from external storage media. The persistent storage of the computer system 1000 and the external media are examples of non-transitory computer-readable storage media, which may be used to store program instructions to be executed by the computer system 1000. A non-transitory computer-readable storage medium may provide the capability to store information in a form readable by a machine (e.g., computer system 1000). Non-transitory computer-readable media may include storage media such as magnetic or optical media, disk or DVD/CD-ROM devices, archival tapes, network-attached storage systems, or other computer systems.

In some embodiments, the I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

In some embodiments, the network interface 1040 may allow data to be exchanged between computer system 1000 and other devices attached to a network. The network interface 1040 may also allow communication between computer system 1000 and various I/O devices and/or remote storage systems. Input/output devices may, in some embodiments, include one or more display terminals, keyboards, keypads, touchpads, scanning devices, voice or optical recognition devices, or any other devices suitable for entering or retrieving data by one or more computer systems 1000. Multiple input/output devices may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1050. Network interface 1040 may commonly support one or more wireless networking protocols (e.g., Wi-Fi/IEEE 802.11, or another wireless networking standard). In some embodiments, the network interface 1040 may support communication via telecommunications/telephony networks such as analog voice networks or digital fiber communications networks, via storage area networks such as Fibre Channel SANs, or via any other suitable type of network and/or protocol.

Although the embodiments above have been described in considerable detail, numerous variations and modifications may become apparent to those skilled in the art once the disclosed inventive concepts are fully appreciated. It is intended that the following claims be interpreted to embrace all such variations and modifications, and the above description to be regarded in an illustrative rather than a restrictive sense.

What is claimed is:

1. A method comprising:
  performing, by an approximate search system implemented by one or more hardware processors with associated memory:
    receiving, via a configuration interface of the approximate search system, configuration information for executing an approximate search of a string in a text, wherein the configuration information limits an amount of memory used to execute the approximate search and specifies:
      (a) deviation operations permitted on the string during the approximate search,
      (b) respective costs of the deviation operations, and
      (c) a cost limit for the approximate search;
    executing the approximate search according to the configuration information, comprising:

maintaining in memory a subset of states of a state machine generated during the approximate search, wherein individual ones of the states specify:
  (a) a match position in the string achieved at the individual state,
  (b) a last deviation operation performed on the string to achieve the individual state, and
  (c) a cost accumulated for any deviation operations performed on the string to achieve the individual state;
repeatedly modifying the subset of states in memory for successive characters in the text, comprising:
  generating one or more new states from one or more preceding states of the state machine by applying one or more last deviation operations indicated by the one or more preceding states to advance search paths in the approximate search, and
  pruning one or more existing states of the state machine whose accumulated cost from previous deviation operations exceed the cost limit, so that the approximate search abandons respective search paths leading to the one or more existing states;
determining an approximate match of the string in the text in response to reaching an end state of the state machine, wherein a match position of end state equals a final match position of the string, and a cost of the end state is below the cost limit for the approximate search; and
outputting the approximate match of the string.

2. The method of claim 1, further comprising the approximate search system:
generating a string traversal graph for the string, wherein the string traversal graph is used to generate the one or more new states from the one or more preceding states of the state machine.

3. The method of claim 1, wherein the configuration interface is configured to receive a cost function for calculating the costs accumulated in individual ones of the states.

4. The method of claim 1, wherein the cost limit is specified based at least in part on a length of the string.

5. The method of claim 1, wherein the configuration interface is configured to receive one or more rules that control execution of the approximate search, comprising:
a rule that requires that the approximate match to match a specified number of first characters of the string;
a rule that permits character case to be ignored during the approximate search; or
a rule that permits multiple whitespaces in the text to be treated as a single whitespace during the approximate search.

6. The method of claim 1, wherein the deviation operations comprise two or more of:
inserting a character in the string,
deleting a character from the string, and
substituting a character in the string with another character.

7. The method of claim 1, wherein
the approximate search is executed in response to a search request received via a graphical user interface (GUI) of the approximate search system, and
the approximate match of the string is outputted via the GUI.

8. The method of claim 1, further comprising the approximate search system:
generating multiple end states from the approximate search; and
selecting one of the multiple end states as the approximate match, wherein the selected end state has a lowest cost among the multiple end states.

9. The method of claim 1, further comprising the approximate search system:
generating multiple end states from the approximate search; and
outputting the multiple end states as approximate matches for the text, wherein the multiple end states are sorted based at least in part on their respective costs.

10. The method of claim 1, further comprising the approximate search system:
in response to a determination that the end state indicates a cost of zero, outputting the approximate match without examining further characters in the text.

11. A system comprising:
one or more hardware processors with associated memory that implement an approximate search system, configured to:
  receive, via a configuration interface of the approximate search system, configuration information for executing an approximate search of a string in a text, wherein the configuration information limits an amount of memory used to execute the approximate search and specifies:
    (a) deviation operations permitted on the string during the approximate search,
    (b) respective costs of the deviation operations, and
    (c) a cost limit for the approximate search;
  execute the approximate search according to the configuration information, including to:
    maintain in memory a subset of states of a state machine generated during the approximate search, wherein individual ones of the states specify:
      (a) a match position in the string achieved at the individual state,
      (b) a last deviation operation performed on the string to achieve the individual state, and
      (c) a cost accumulated for any deviation operations performed on the string to achieve the individual state;
    repeatedly modify the subset of states in memory for successive characters in the text, comprising:
      generate one or more new states from one or more preceding states of the state machine by applying one or more last deviation operations indicated by the one or more preceding states to advance search paths in the approximate search, and
      prune one or more existing states of the state machine whose accumulated cost from previous deviation operations exceed the cost limit, so that the approximate search abandons respective search paths leading to the one or more existing states;
    determine an approximate match of the string in the text in response to reaching an end state of the state machine, wherein a match position of end state equals a final match position of the string, and a cost of the end state is below the cost limit for the approximate search; and
    output the approximate match of the string.

12. The system of claim 11, wherein the configuration interface is configured to receive a cost function for calculating the costs accumulated in individual ones of the states.

13. The system of claim 11, wherein the cost limit is specified based at least in part on a length of the string.

14. The system of claim 11, wherein the configuration interface is configured to receive one or more rules that control execution of the approximate search, comprising:
- a rule that requires that the approximate match to match a specified number of first characters of the string;
- a rule that permits character case to be ignored during the approximate search; or
- a rule that permits multiple whitespaces in the text to be treated as a single whitespace during the approximate search.

15. The system of claim 11, wherein the deviation operations comprises two or more of:
- inserting a character in the string,
- deleting a character from the string, and
- substituting a character in the string with another character.

16. The system of claim 11, wherein
- the approximate search is executed in response to a search request received via a graphical user interface (GUI) of the approximate search system, and
- the approximate match of the string is outputted via the GUI.

17. The system of claim 16, wherein the approximate search system is configured to:
- output exact matches of the string in the text via the GUI,
- determine that a number of the exact matches falls below a threshold, and
- provide an option on the GUI to search for the string again using the approximate search.

18. The system of claim 11, wherein the approximate string search system is configured to:
- scan event records captured from a group of computers; and
- wherein the approximate search is used to scan the event records for one or more types of text fields, including one or more of:
    (a) an executable name,
    (b) an email address,
    (c) a web address, and
    (d) a user name.

19. The system of claim 18, the approximate string search system is configured to:
- store the string as a search term in a library, wherein search terms in the library are used to scan the event records; and
- add the approximate match to the library as an additional search term to use for future scans.

20. One or more non-transitory computer readable media storing program instructions that when executed on one or more processors implement an approximate search system and cause the approximate search system to:
- receive, via a configuration interface of the approximate search system, configuration information for executing an approximate search of a string in a text, wherein the configuration information limits an amount of memory used to execute the approximate search and specifies:
    (a) deviation operations permitted on the string during the approximate search,
    (b) respective costs of the deviation operations, and
    (c) a cost limit for the approximate search;
- execute the approximate search according to the configuration information, including to:
    maintain in memory a subset of states of a state machine generated during the approximate search, wherein individual ones of the states specify:
        (a) a match position in the string achieved at the individual state,
        (b) a last deviation operation performed on the string to achieve the individual state, and
        (c) a cost accumulated for any deviation operations performed on the string to achieve the individual state;
    repeatedly modify the subset of states in memory for successive characters in the text, comprising:
        generate one or more new states from one or more preceding states of the state machine by applying one or more last deviation operations indicated by the one or more preceding states to advance search paths in the approximate search, and
        prune one or more existing states of the state machine whose accumulated cost from previous deviation operations exceed the cost limit, so that the approximate search abandons respective search paths leading to the one or more existing states;
    determine an approximate match of the string in the text in response to reaching an end state of the state machine, wherein a match position of end state equals a final match position of the string, and a cost of the end state is below the cost limit for the approximate search; and
    output the approximate match of the string.

* * * * *